(12) United States Patent
Gerhardt et al.

(10) Patent No.: US 8,474,894 B2
(45) Date of Patent: Jul. 2, 2013

(54) MOVABLE BULKHEAD SYSTEM TO INCREASE LOAD CAPACITY OF A VEHICLE

(75) Inventors: Torsten Gerhardt, London (GB); Steve David Fleming, Hockley (GB); John K. Harding, Leigh-on-Sea (GB)

(73) Assignee: Ford Global Technologies, LLC, Dearborn, MI (US)

( * ) Notice: Subject to any disclaimer, the term of this patent is extended or adjusted under 35 U.S.C. 154(b) by 249 days.

(21) Appl. No.: 13/037,402

(22) Filed: Mar. 1, 2011

(65) Prior Publication Data

US 2011/0148134 A1  Jun. 23, 2011

(51) Int. Cl.
  *B60N 3/00*  (2006.01)
(52) U.S. Cl.
  USPC ........................................ 296/24.43
(58) Field of Classification Search
  USPC ............... 296/24.43, 182.1, 186.1, 190.08, 296/24.4, 26.01, 26.08, 37.5; 244/171.7; 410/129, 130, 135; 293/132, 133
  See application file for complete search history.

(56) References Cited

U.S. PATENT DOCUMENTS

| | | | | |
|---|---|---|---|---|
| 3,169,781 A * | 2/1965 | Abruzzino | ............... | 280/749 |
| 4,595,227 A * | 6/1986 | Setina | ............... | 296/24.46 |
| 4,919,467 A * | 4/1990 | Guimelli | ............... | 296/24.43 |
| 5,058,941 A * | 10/1991 | Solomon et al. | ............ | 296/24.46 |
| 5,511,842 A * | 4/1996 | Dillon | ............... | 296/24.42 |
| 6,059,313 A * | 5/2000 | Coogan et al. | ............... | 280/749 |
| 6,502,859 B1 * | 1/2003 | Svetlik | ............... | 280/749 |
| 7,086,678 B2 * | 8/2006 | Schlecht | ............... | 296/24.43 |
| 7,140,656 B2 * | 11/2006 | Allgayer et al. | ............ | 296/24.43 |
| 7,195,297 B2 * | 3/2007 | Murray et al. | ............... | 296/24.4 |
| 7,300,085 B2 * | 11/2007 | Giumelli | ............... | 296/24.43 |
| 7,318,614 B2 * | 1/2008 | Steiger et al. | ............... | 296/24.4 |
| 7,717,484 B2 * | 5/2010 | Parle et al. | ............... | 296/24.4 |
| 7,909,379 B2 * | 3/2011 | Winget et al. | ............... | 296/24.43 |
| 8,172,295 B2 * | 5/2012 | Fischer et al. | ............... | 296/24.43 |
| 8,251,426 B2 * | 8/2012 | Gerhardt | ............... | 296/65.01 |
| 2003/0141731 A1 * | 7/2003 | Betts et al. | ............... | 296/24.1 |
| 2007/0018473 A1 * | 1/2007 | Alliger et al. | ............... | 296/24.4 |
| 2007/0210597 A1 * | 9/2007 | Wang | ............... | 296/24.43 |
| 2011/0156429 A1 * | 6/2011 | Shimizu et al. | ............ | 296/26.09 |
| 2011/0241372 A1 * | 10/2011 | Kusu | ............... | 296/24.43 |
| 2011/0260484 A1 * | 10/2011 | Takemura | ............... | 296/24.43 |
| 2011/0266822 A1 * | 11/2011 | Takemura | ............... | 296/24.43 |
| 2013/0001972 A1 * | 1/2013 | Ugalde et al. | ............... | 296/24.43 |

* cited by examiner

*Primary Examiner* — Kiran B Patel
(74) *Attorney, Agent, or Firm* — Shook Hardy & Bacon LLP

(57) ABSTRACT

A moveable bulkhead 10, 110 for a motor vehicle such as a van 1 is disclosed comprising of a number of panels 11, 12, 13; 111, 112, and 113 hingedly connected together to permit the bulkhead 10 to be moved or transformed between forward and rear positions by rotation of the panels 11, 12, 13; 111, 112, and 113. The bulkhead 10 is "U"-shaped defining a concavity that faces forward when the bulkhead 10 is latched in the forward position and rearwardly when the bulkhead 10 is latched in the rear position so as to maximize the cargo carrying capacity of the van 1.

7 Claims, 27 Drawing Sheets

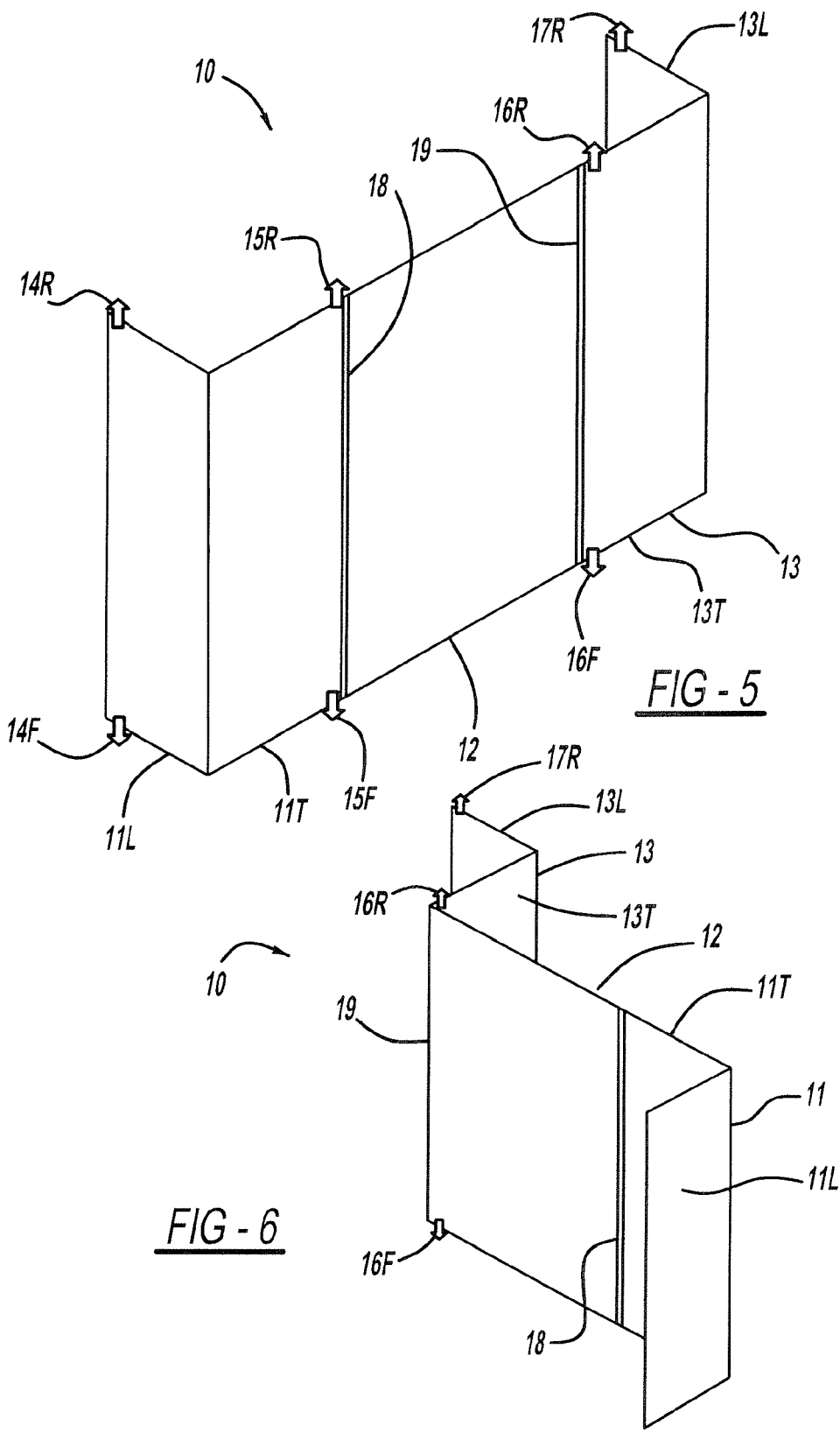

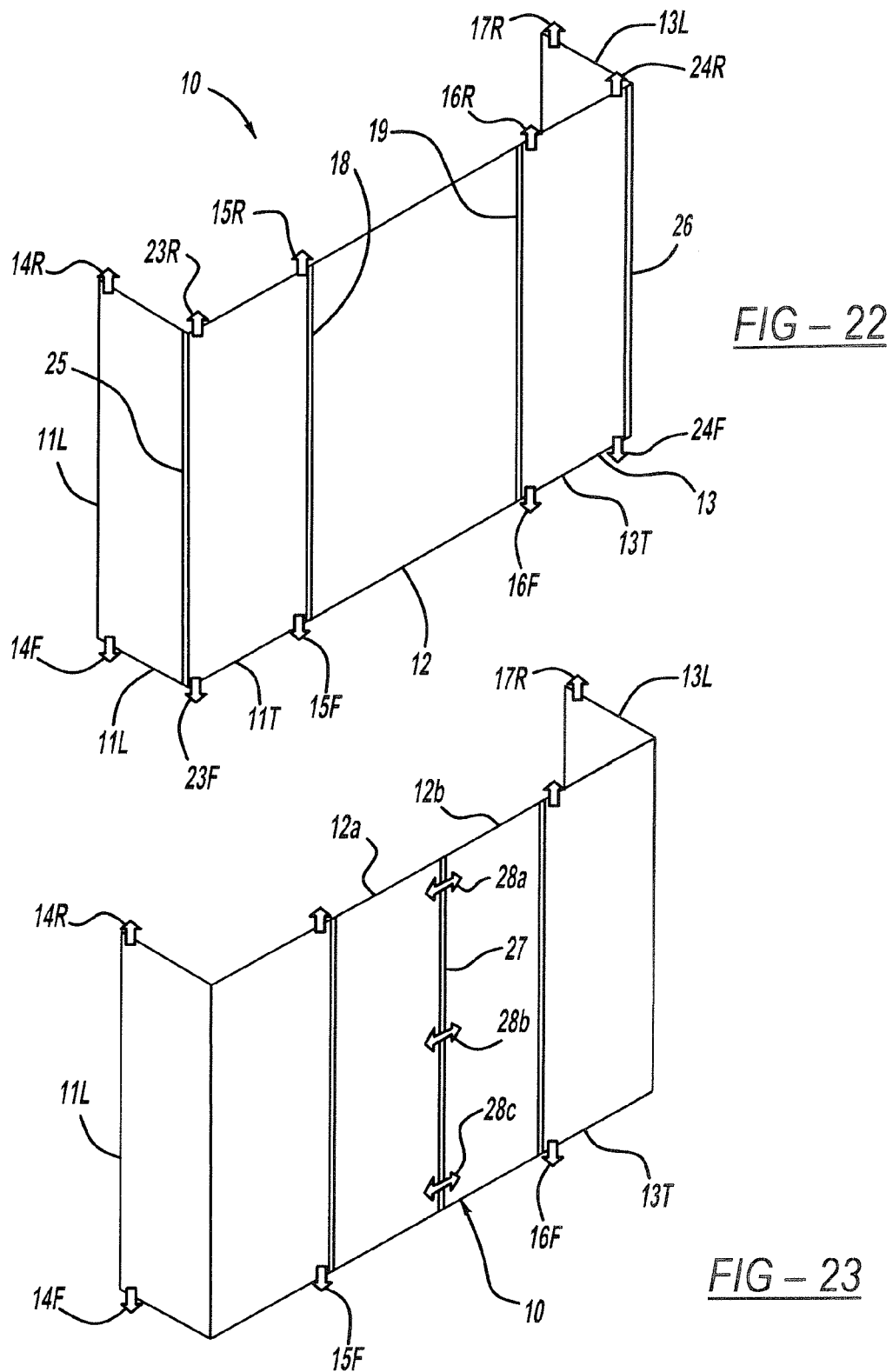

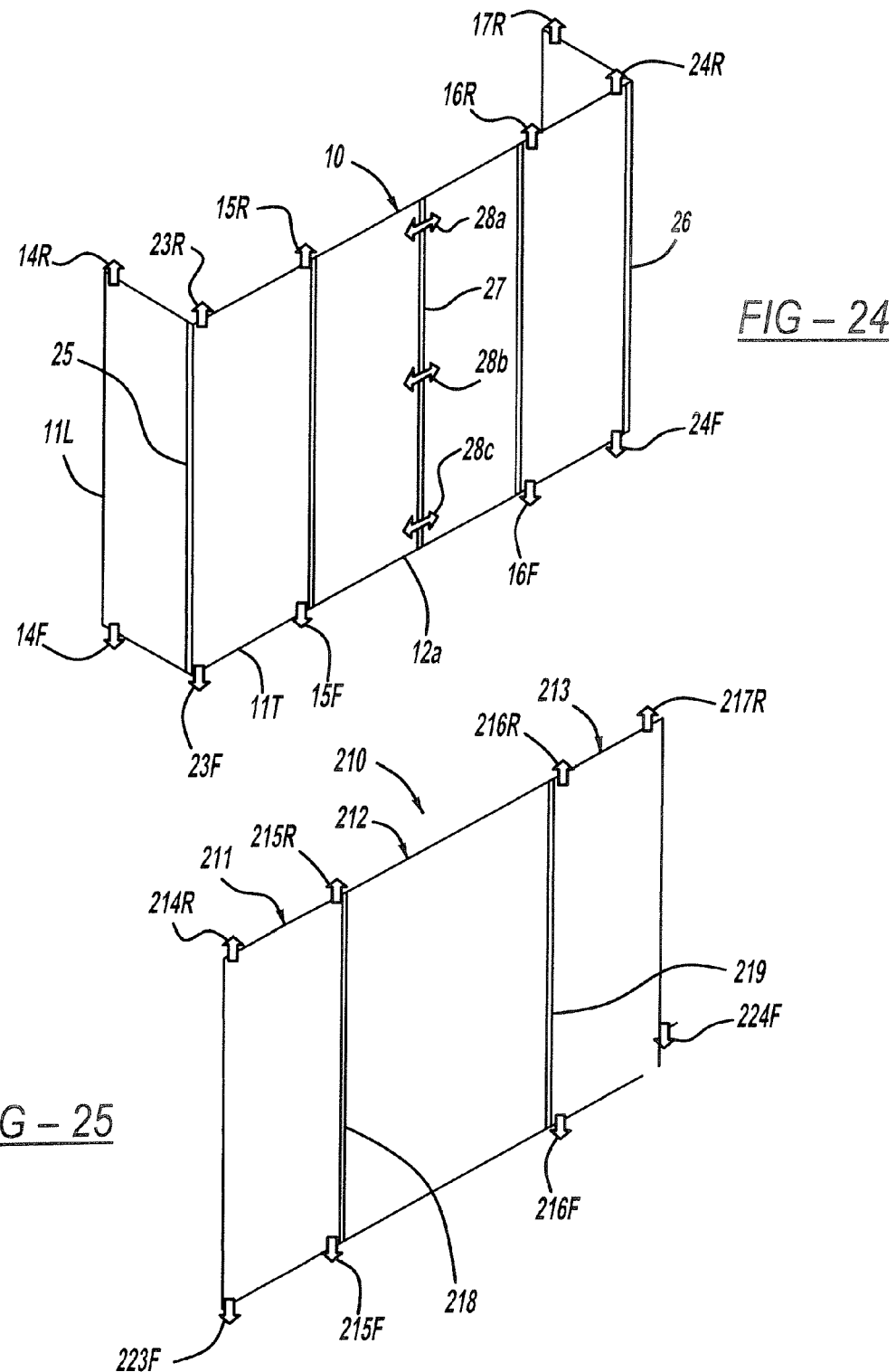

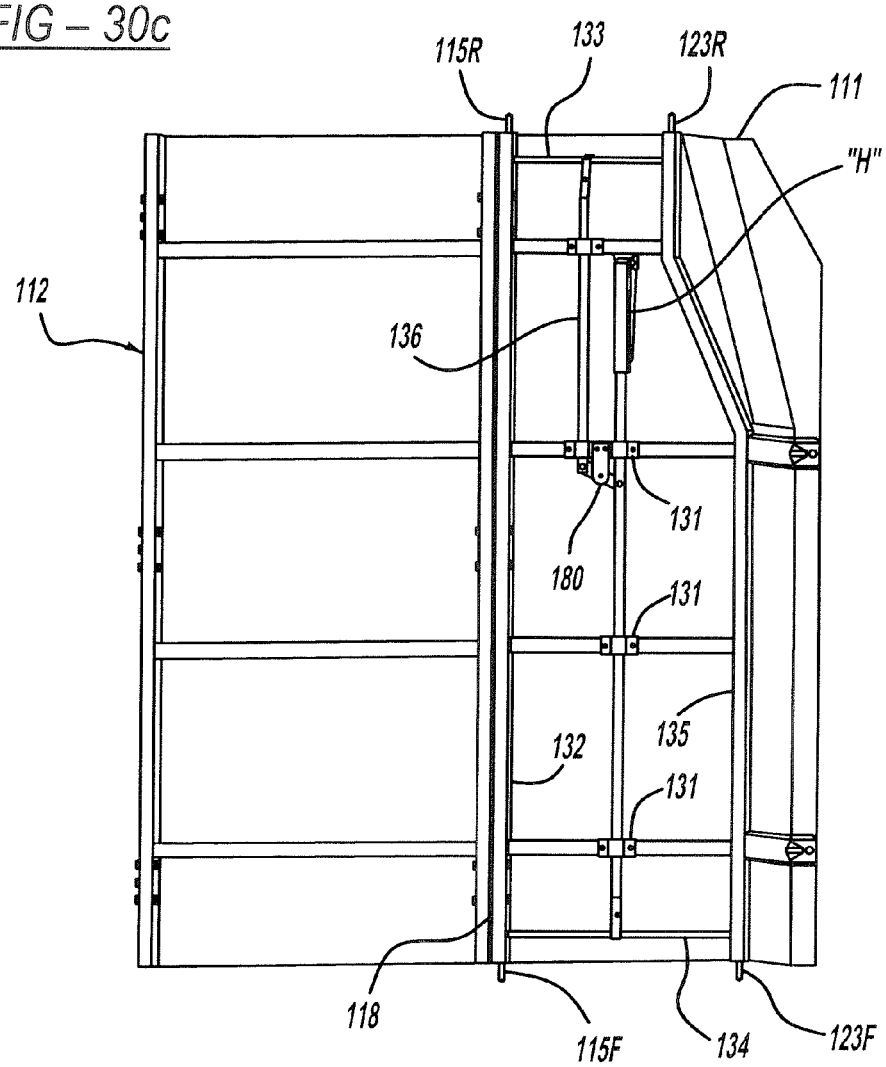
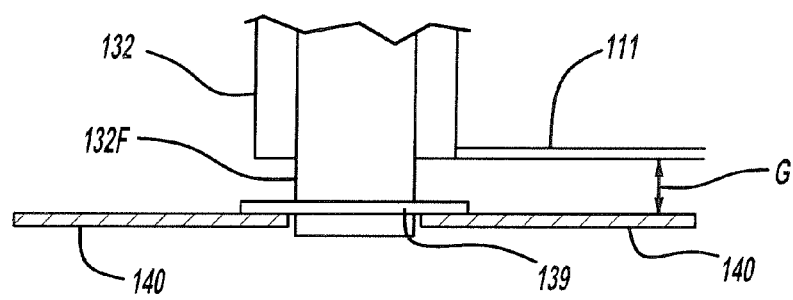

MOVABLE BULKHEAD SYSTEM TO INCREASE LOAD CAPACITY OF A VEHICLE

TECHNICAL FIELD

The disclosed invention relates to a bulkhead for a cargo vehicle. More particularly, the disclosed invention relates to a bulkhead that can be moved through several positions to increase the load capacity of a cargo vehicle.

BACKGROUND OF THE INVENTION

Cargo vehicles, such as commercial vans and the like, typically have a bulkhead separating the driver and passenger space from the cargo space. Bulkheads separate the driver and passenger space from the cargo space by extending from one side of the vehicle to the other and from the floor of the vehicle to the ceiling. Bulkheads typically consist of a one-piece sheet metal design, but could also be a multi-piece assembly such that two large stampings spot welded together form a box beam where the upper and lower portions overlap. Plywood and high strength plastics have also been used for bulkheads. Occasionally bulkheads have a portion cut out near the top so as to serve as a window for the driver to see into the cargo space and beyond the rear of the vehicle via use of the rearview mirror.

While effectively defining cargo space, the challenge presented by the known commercial van bulkhead is that it reduces overall flexibility of the vehicle. To have maximum flexibility it is desirable for the van to be a "dual usage" van which can be used to transport workers to a building site in the morning, be used to transport large goods during the working day and then be used to take the workers back home in the evening or as a multi-use vehicle that can operate as family transport or as a business van for owner operators.

In order to meet the demands of this role the vehicle must be able to be easily converted between a single and a double cab van without requiring parts to be removed from the vehicle while meeting safety requirements such as the need for a full bulkhead in both configurations.

A moveable bulkhead with collapsible seats is known from, for example, GB-A-2,384,464. This arrangement provides a full uncompromised seating position in one condition and a tightly packaged stowed condition but has the disadvantage that the seats are mounted to the bulkhead. The mounting of the seats to the bulkhead is disadvantageous because it requires a more significant structure to be used for the bulkhead resulting in increased vehicle weight and places unique and expensive requirements on the bulkhead mechanism and latches in order to meet safety standards particularly seat belt standards.

There are at least two main problems with the known art of sliding bulkheads and these are ergonomics and packaging.

The ergonomics issue relates to the process required to move the bulkhead from one position to the other, because the moveable bulkhead needs to package as tightly around the stowed seats as possible so as not to loose package space, the sliding bulkhead cannot be operated from a position between the stowed seats and the bulkhead, but only from behind the bulkhead, that is to say, from the load/cargo space.

This means that moving the bulkhead from the forward position to the rear will trap the operator in the cargo area or, when moving the bulkhead to the forward position from the rear position, the operator must enter the cargo area of the vehicle through the rear doors to move the bulkhead and this may be dangerous or impossible if the vehicle is fully loaded. Although this problem can be mitigated by moving the bulkhead partially and then making use of the side load door (side cargo door) to squeeze around to the other side before completing the translatory movement of the bulkhead, this requires access to the mechanism and latches from both sides of the bulkhead which adds complexity and cost to the securing mechanism and is inconvenient.

Regarding the packaging problem, when the 2nd row seats are stowed, they normally still package rearward of the vehicle's b-pillars, requiring the bulkhead to form a shallow "U" or "C" section in plan view in order to reach around the seats to the structure and sealing flanges of the b-pillar. That is to say, the side portions of the bulkhead must extend forwardly so as to be securable to the structure adjacent the b-pillar. When the bulkhead is moved rearwards to the c-pillar, this "U"-shape of the bulkhead protrudes past the c-pillar into the cargo area thereby reducing the stowage volume significantly. Although this could be partially mitigated by providing an alternative or 2nd latching and sealing feature on the rear plane of the bulkhead, such that the bulkhead only has to be moved until the rearward latching features reach the c-pillar, such a mechanism adds cost and complexity whilst the unused forward latch mechanisms/seal flanges offer questionable styling.

It would be advantageous to provide a moveable bulkhead for a vehicle that is easy to move, install or remove from the vehicle and maximizes available cargo space irrespective of the seating configuration of the vehicle.

Accordingly, as in so many areas of vehicle storage technology, there is room for further advancement in the art of moveable bulkhead constructions.

SUMMARY OF THE INVENTION

The present invention provides an alternative arrangement to known commercial vehicle bulkheads. According to a first aspect of the invention there is provided a moveable bulkhead for a motor vehicle comprising a number of panels hingedly connected together so as to permit each panel to rotate about a vertical axis relative to an adjacent panel and latches to selectively secure the panels forming the bulkhead in the motor vehicle so as to prevent rotation of the panels and separate a cargo carrying compartment of the motor vehicle from a passenger carrying compartment of the motor vehicle wherein the bulkhead is latchable in at least a forward position and a rear position and is transformable between the two positions by the sequential un-latching, rotation and re-latching of the panels.

The bulkhead may include at least first and second end panels and a middle panel and the bulkhead may be transformed to move it between the forward and rear positions such that the first end panel is a left hand end panel when the bulkhead is latched in the forward position and is a right hand end panel when the bulkhead is latched in the rear position and the second end panel is a left hand end panel when the bulkhead is latched in the rear position and is a right hand end panel when the bulkhead is latched in the forward position.

The width of the middle panel may be substantially equal to the distance between the forward and rear positions of the bulkhead so as to permit the latches to be re-latched when the middle panel has been rotated through 90 degrees.

The bulkhead may include at least first and second end panels each of which extends forwardly when the bulkhead is latched in a forward position in the vehicle and extends rearwardly when the bulkhead is latched in a rear position in the vehicle.

Each of the first and second end panels may be "L"-shaped having wing portions that are arranged longitudinally with respect to the vehicle when the bulkhead is latched in the vehicle in either of the forward and rear positions and body portions that are arranged transversely with respect to the vehicle when the bulkhead is latched in the vehicle in either of the forward and rear positions.

The bulkhead may be further latchable in a side-locker position.

Each of the first and second end panels may be "L"-shaped having wing portions that are arranged longitudinally with respect to the vehicle when the bulkhead is latched in the vehicle in the side locker position and body portions that are arranged transversely with respect to the vehicle when the bulkhead is latched in the vehicle in the side locker position.

The moveable bulkhead may comprise the first end panel which extends forwardly when the bulkhead is latched in the forward position in the vehicle and extends rearwardly when the bulkhead is latched in the rear position, the second end panel which extends forwardly when the bulkhead is latched in a forward position in the vehicle and extends rearwardly when the bulkhead is latched in the rear position and a middle panel which is hingedly connected at one end to the first end panel and is hingedly connected at an opposite end to the second end panel.

According to a second aspect of the invention there is provided a motor vehicle having a body structure defining an interior space that is dividable by means of a moveable bulkhead constructed in accordance with said first aspect of the invention into passenger and cargo areas, a first row of seats including a driver's seat and a stowable second row of seats each of which is moveable between a stowed position and an "in-use" position wherein the bulkhead is reversibly transformable between a forward position located adjacent to but to the rear of the stowed second row of seats and a rear position located adjacent to but to the rear of the second row of seats in their "in-use" positions.

The motor vehicle may have a pair of front passenger doors, at least one rear cargo door, a side cargo door on at least one side of the vehicle, a b-pillar on each side of the vehicle and a c-pillar on each side of the vehicle to the rear of the respective b-pillar wherein, when the bulkhead is located in the forward position, the bulkhead is selectively latchable to the vehicle near to a left hand outer end at a position close to the b-pillar on a left-hand side of the vehicle and the bulkhead is selectively latchable to the vehicle near to a right hand outer end at a position close to the b-pillar on a right-hand side of the vehicle.

The bulkhead may be U-shaped when it is latched in the forward position and end panels of the bulkhead may extend longitudinally forwardly past the stowed second row of seats to positions where they are latched to the motor vehicle close to the b-pillars.

The motor vehicle may have a pair of front passenger doors, at least one rear cargo door, a side cargo door on at least one side of the vehicle a b-pillar on each side of the vehicle and a c-pillar on each side of the vehicle to the rear of the respective b-pillar wherein, when the bulkhead is located in the rear position, the bulkhead may be selectively latchable to the vehicle near to a left hand outer end at a position close to the c-pillar on a left-hand side of the vehicle and the bulkhead may be selectively latchable to the vehicle near to a right hand outer end at a position close to the c-pillar on a right-hand side of the vehicle.

The bulkhead may be U-shaped when it is latched in the rear position and end panels of the bulkhead may extend longitudinally rearwardly away from the "in-use" second row of seats to positions where they are latched to the motor vehicle close to the c-pillars.

Each latch may be operable to raise the bulkhead away from a floor of the motor vehicle when it latched so as to reduce the force required to transform the bulkhead.

The second row of seats may be comprised of at least two separate stowable seats, the bulkhead may be comprised of a first L-shaped end panel which has a wing portion that extends forwardly when the bulkhead is latched in the forward position and is latchable near to the b-pillar on that side of the motor vehicle, a second L-shaped end panel which has a wing portion that extends forwardly when the bulkhead is latched in the forward position and is latchable near to the b-pillar on that side of the motor vehicle and a middle panel which is hingedly connected at one end to the first end panel and is hingedly connected at an opposite end to the second end panel wherein the bulkhead may be transformable to a side locker configuration in which the wing portion of one of the end panels extends longitudinally forwardly and is latchable near to the b-pillar on one side of the motor vehicle, the wing portion of the other end panel extends longitudinally rearwardly and is latchable near to the c-pillar on the same side of the motor vehicle, the middle panel extends longitudinally between the two end panels allowing at least one of the seats forming the second row of seats to be selectively moveable between its "in-use" and stowed positions.

The side locker may be located so as to be accessible via the side cargo door.

According to a third aspect of the invention there is provided a method of reversibly moving a moveable bulkhead between forward and rear positions, the bulkhead comprising a first end panel, a second end panel and a middle panel hingedly connecting together the first and second end panels so as to permit each panel to rotate about a vertical axis relative to an adjacent panel and latches to selectively secure the panels forming the bulkhead in the motor vehicle so as to prevent rotation of the panels wherein the method comprises un-latching part of the bulkhead so as to permit one end panel and the middle panel to be rotated relative to each other and the other end panel, rotating the one end panel and the middle panel into a position that enables them to be secured to the vehicle on the same side of the vehicle as the other end panel, latching the one end panel to the vehicle, unlatching the other end panel and rotating the other end panel and the middle panel relative to each other and the one end panel so as to permit the other end panel to move to a position where it can be re-latched to the vehicle in a corresponding position on an opposite side of the vehicle to the position where the one end panel is latched and latching the other end panel to the vehicle.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 5 is a schematic pictorial view of a moveable bulkhead constructed in accordance with the invention showing the bulkhead in the forward position;

FIG. 6 is a schematic pictorial view of the moveable bulkhead shown in FIG. 5 showing the bulkhead in a partially transformed position;

FIGS. 10 to 13a are schematic plan views showing various stages in the transformation of the bulkhead shown in FIG. 9;

FIGS. 14 to 17 are schematic plan views showing the stages of transformation following on from FIG. 13a;

FIG. 20b is a reverse pictorial view of the bulkhead shown in FIG. 20a;

FIG. 21b is a reverse pictorial view of the bulkhead shown in FIGS. 20a and 20b in a side locker position corresponding to the position shown in FIGS. 7 and 13a;

FIG. 21c is a reverse pictorial view of the bulkhead shown in FIG. 21a;

FIGS. 22 to 25 are alternative embodiments of a moveable bulkhead according to the invention shown in the forward position;

FIG. 30c is a view in the direction of arrow Z on FIG. 21a showing the securing mechanism for one of the panels;

FIG. 30d is an enlarged view of one embodiment of a latch;

DETAILED DESCRIPTION OF THE PREFERRED EMBODIMENT

Figure 1:
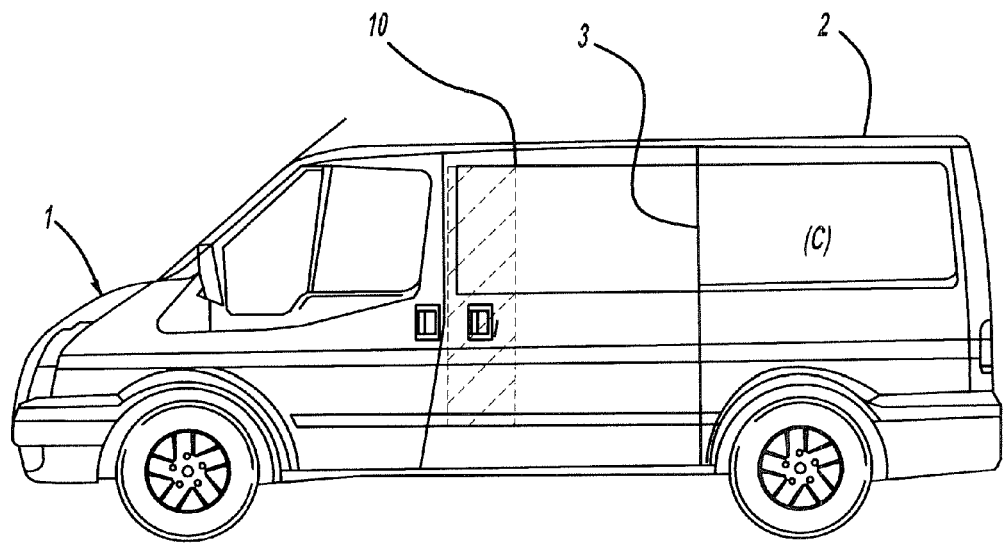
FIG. 1 is a schematic side view of a motor vehicle showing a moveable bulkhead in a forward position with a second row of seats in a stowed position.

In the following figures, the same reference numerals will be used to refer to the same components. In the following description, various operating parameters and components are described for different constructed embodiments. These specific parameters and components are included as examples and are not meant to be limiting.

FIGS. 1 to 4 show a motor vehicle in the form of a dual usage van 1 having a body structure defining an interior space that is dividable by means of a moveable bulkhead 10 into a passenger area and a cargo area 'C'. A first row of seats 4 includes a driver's seat and is mounted in the van 1 so as to be permanently in an "in-use" condition. A stowable second row of seats 5 is located to the rear of the first row of seats 4. The second row of seats 5 in this case comprises two seats 5a, 5b each of which is moveable between a stowed position and an "in-use" position. The van 1 has a side cargo door 3 on either or both sides to permit cargo to be loaded and unloaded from the side of the van 1 and to provide access to the second row seats 5 when they are in their "in-use" positions. When in the stowed position, the two seats 5a, 5b are stowed vertically so as to occupy the minimum space.

Figure 2:
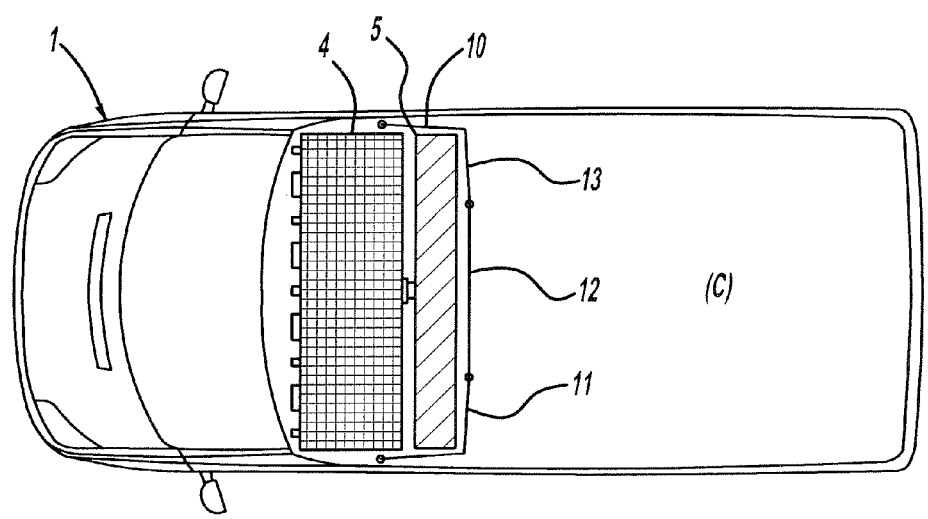
FIG. 2 is a plan view of the motor vehicle shown in FIG. 1.
Figure 3:
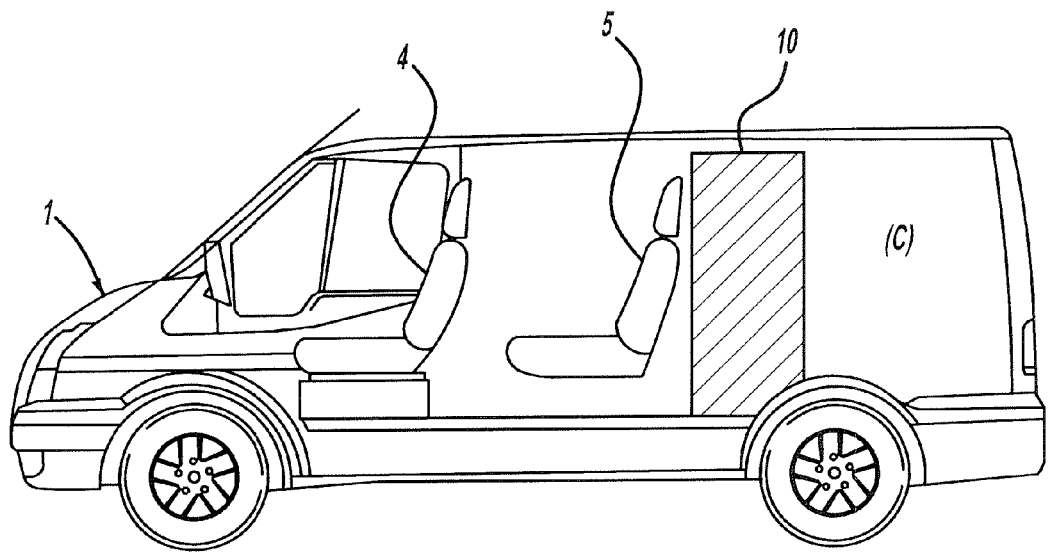
FIG. 3 is a schematic side view of the motor vehicle shown in FIG. 1 showing the moveable bulkhead in a rear position with the second row of seating in an "in-use" position.
Figure 4:
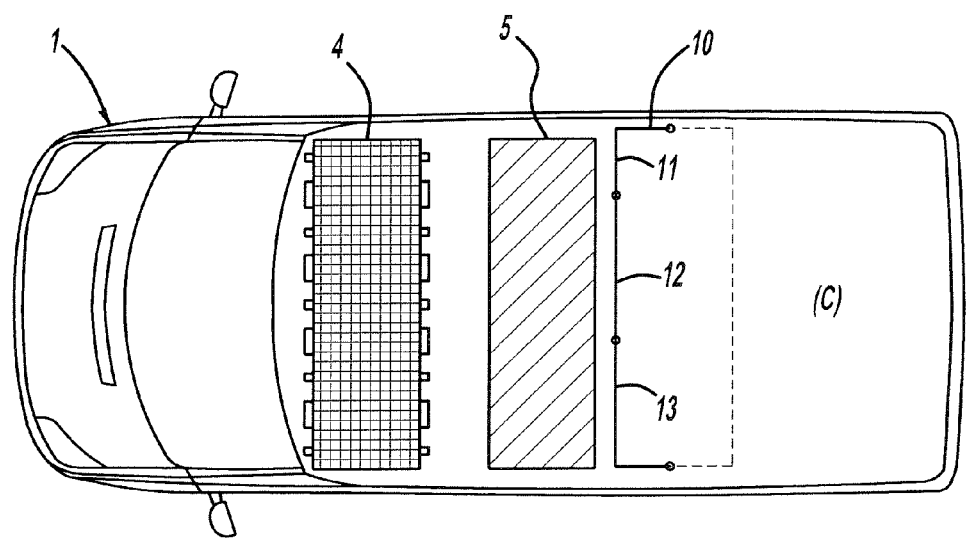
FIG. 4 is a plan view of the motor vehicle shown in FIG. 3.

The bulkhead 10 is reversibly transformable between a forward position located adjacent to but to the rear of the stowed second row seats 5 as shown in FIGS. 1 and 2 and a rear position located adjacent to but to the rear of the second row seats 5 in their "in-use" positions as shown in FIGS. 3 and 4. The plane 'p' indicates the position of the middle panel 12 would adopt if the bulkhead 10 were to be merely slid back.

The moveable bulkhead 10 comprises three panels 11, 12, 13 hingedly connected together so as to permit each panel 11, 12, 13 to rotate about a vertical axis relative to an adjacent panel 11, 12, 13 and latches (not shown in FIGS. 1 to 4) to selectively secure the panels 11, 12, 13 forming the bulkhead 10 in the van 1 either directly or via an adjoining panel so as to prevent rotation of the panels 11, 12, 13 and separate the cargo compartment 'C' of the van 1 from the passenger carrying compartment of the van 1.

The bulkhead 10 is latchable by means of the latches in the forward position and rear positions and is transformable between the two positions by the sequential un-latching, rotation and re-latching of the panels 11, 12, 13.

With reference to FIGS. 5 to 19 there is shown in diagrammatic form the transformation of the bulkhead 10 between the forward and rear positions including an intermediate position referred to hereinafter as a side locker position.

Figure 7:
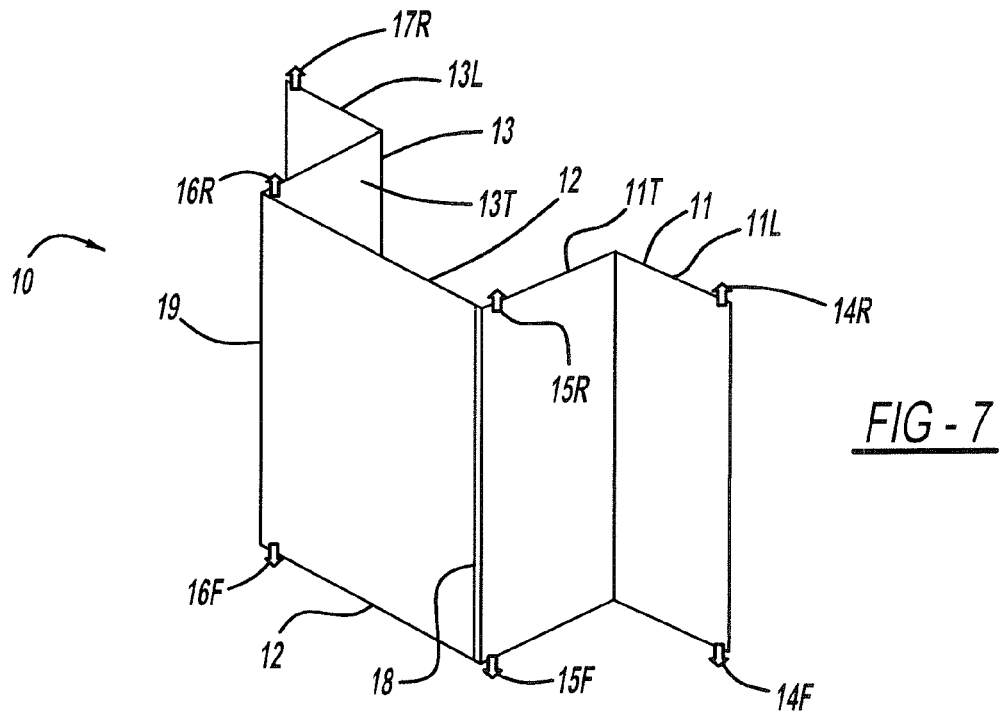
FIG. 7 is a schematic pictorial view of the moveable bulkhead shown in FIG. 5 showing the bulkhead transformed to form a side locker.
Figure 8:
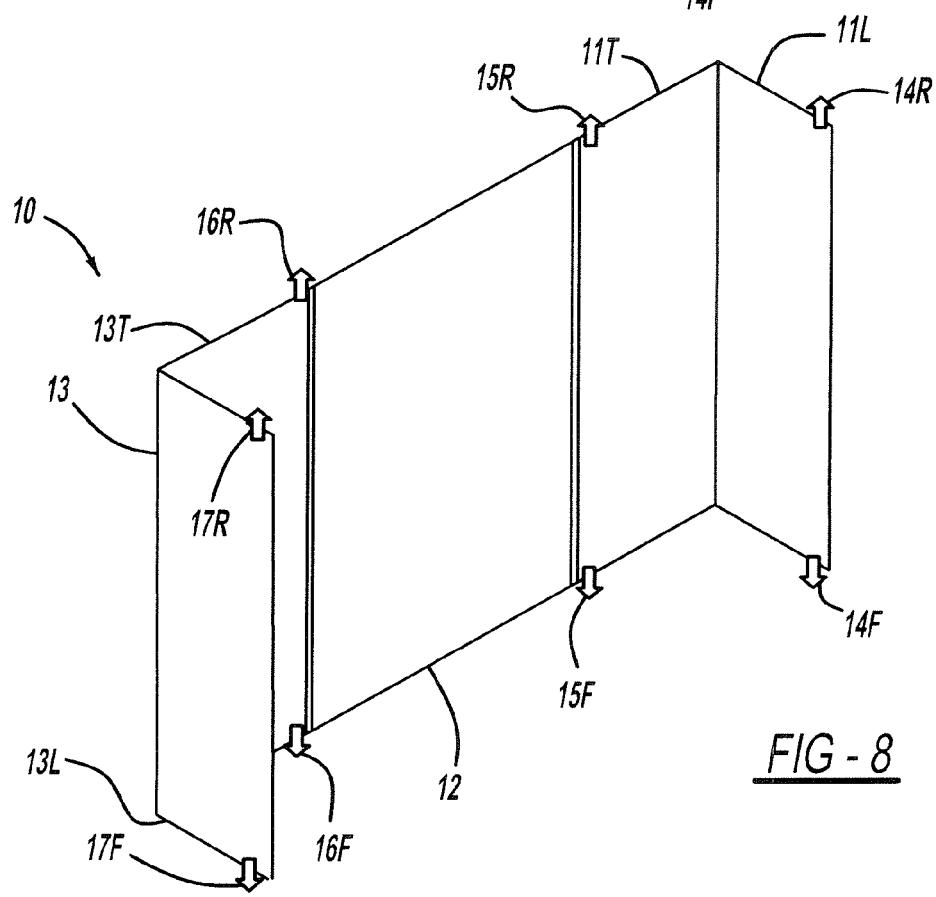
FIG. 8 is a schematic pictorial view of the moveable bulkhead shown in FIG. 5 showing the bulkhead transformed to the rear position.

Referring firstly to FIGS. 5 to 8 the bulkhead 10 can be seen to comprise first and second end panels 11 and 13 each of which extends forwardly when the bulkhead 10 is latched in the forward position in the van 1 as shown in FIG. 5 and extends rearwardly when the bulkhead 10 is latched in the rear position in the van 1 as shown in FIG. 8.

Each of the first and second end panels 11 and 13 is "L"-shaped having wing portions 11L, 13L that are arranged longitudinally with respect to the van 1 when the bulkhead 10 is latched in the van 1 in either of the forward and rear positions and body portions 11T, 13T that are arranged transversely with respect to the van 1 when the bulkhead 10 is latched in the van 1 in either of the forward and rear positions.

The first end panel 11 is hingedly connected to a middle panel 12 by a number of hinges (not shown) so as to permit the first end panel 11 to pivot relative to the middle panel 12 about a vertical pivot axis 18 and the second end panel 13 is hingedly connected to the middle panel 12 by a number of hinges (not shown) so as to permit the second end panel 11 to pivot relative to the middle panel 12 about a vertical pivot axis 19.

The bulkhead 10 includes a latch system including a number of latches 14, 15, 16 and 17 which comprise an upper set of latches 14R, 15R, 16R and 17R which are arranged in use to be selectively engageable with a roof member of the van 1 and a lower set of latches 14F, 15F, 16F and 17F which are arranged in use to be selectively engageable with a floor structure or floor cassette 6 of the van 1.

The width of the middle panel 12 corresponds approximately to the distance by which the bulkhead 10 moves when it is transformed from its forward location to the rear location. That is to say, the distance between the latches 15R and 15F and the pivot axis 19 and the distance between the latches 16R and 16F and the pivot axis 18 are both equal to the distance between the securing positions of the bulkhead 10 in its forward and rear positions so that when the middle panel 12 is rotated though 90 degrees the bulkhead 10 can be re-latched to the vehicle 1 in the other position. See FIG. 9 where the width "W" between the pivot axes 18, 19 and the opposite latches 16R, 15R is equal to the distance D' between the current fixing points (not visible) and the fixings points 85 for the bulkhead 10 when in the rear position. Because the offsets between the pivot axes 18, 19 and the latches 15, 16 from the edges of the middle panel 12 are relatively small compared to the width of the middle panel 12 the distance D' can said to be substantially equal to the width of the middle panel 12.

Preferably the latches 14, 15, 16 and 17 are arranged in groups so that a single mechanism can be used to operate several of the latches 14, 15, 16 and 17. In the example shown a first mechanism (not shown) is used to selectively simultaneously latch and unlatch the latches 14R, 15R, 14F and 15F as a first group and a second mechanism (not shown) is used to simultaneously latch and unlatch the latches 16R, 17R, 16F and 17F as a second group. This allows the first end panel 11 to be latched and unlatched by merely operating the first mechanism and similarly allows the second end panel 13 to be latched and unlatched by merely operating the second mechanism.

To transform the bulkhead 10 from the forward position as shown in FIG. 5 the first step is to unlatch the latches 14R, 15R, 14F and 15F while maintaining the latches 16R, 17R, 16F and 17F latched. The first end panel 11 and the middle panel 12 can then be rotated relative to the second end panel 13 about the pivot axis 19 as shown in FIG. 6, the first end panel 11 can then be rotated relative to the middle panel 12 about the pivot axis 18 until it reaches its new rear position as shown in FIG. 7. The latches 14R, 15R, 14F and 15F are then re-latched so as to secure the first end panel 11 in the rear position.

The latches 16R, 17R, 16F and 17F securing the second end panel 13 are then unlatched and the second end panel 13 along with the middle panel 12 are rotated about the pivot axis 18 until the second end panel 13 reaches its rear position as shown in FIG. 8 and the latches 16R, 17R, 16F and 17F are then re-latched so as to secure the second end panel 13 in its rear position.

It will be appreciated that the transformation of the bulkhead 10 could alternatively be started by unlatching the second end panel 13 first and then, when the second end panel 13 has been latched in its new position, unlatching and moving the first end panel 11. It will also be appreciated that the process is reversed to move the bulkhead 10 back to the forward position.

The movement of the bulkhead 10 between its forward and rear positions is referred to as a transformation because the first end panel 11 is a left hand end panel when the bulkhead 10 is latched in the forward position and is a right hand end panel when the bulkhead 10 is latched in the rear position and the second end panel 13 is a left hand end panel when the bulkhead 10 is latched in the rear position and is a right hand end panel when the bulkhead 10 is latched in the forward position.

Because the bulkhead 10 requires no tracks on the floor of the van the floor can remain flat and unobstructed thereby reducing the risk of an item of cargo fouling the tracks when being loaded or unloaded and the folding nature of the bulkhead 10 allows it to be operated simply with no risk of the operator becoming trapped in the cargo area 'C' of the van 1. In addition, because the bulkhead folds up, the bulkhead 10 can be more easily removed or installed in the van 1.

With particular reference to FIGS. 9 to 19 the transformation of the bulkhead 10 from the forward position to the rear position will be described in greater detail.

The van 1 has a pair of front passenger doors, a pair of side hinged rear cargo doors, a side cargo door 3 in this case on each side of the van 1, a b-pillar 20 on each side of the van 1, each of the b-pillars 20 defining a front edge of an aperture 22 in a side of the van 1 and a c-pillar 21 on each side of the van 1 to the rear of the respective b-pillar 20 defining a rear edge of the aperture 22. Each of the apertures 22 defines a side cargo loading aperture that is closed off by a respective side cargo door 3 when the side cargo door 3 is in a closed position.

When the bulkhead 10 is located in the forward position, the bulkhead 10 is latchable by means of the latches 17R, 17F to the van 1 near to a right hand outer end at a position close to the b-pillar 20 on a right-hand side of the van 1 and the bulkhead 10 is latchable by means of the latches 14R, 14F to the van 1 near to a left hand outer end at a position close to the b-pillar 20 on a left-hand side of the van 1. This enables the bulkhead 10 to make use of the reinforcing structure used to connect the b-pillars 20 to the floor and roof structure of the van 1.

Figure 9:
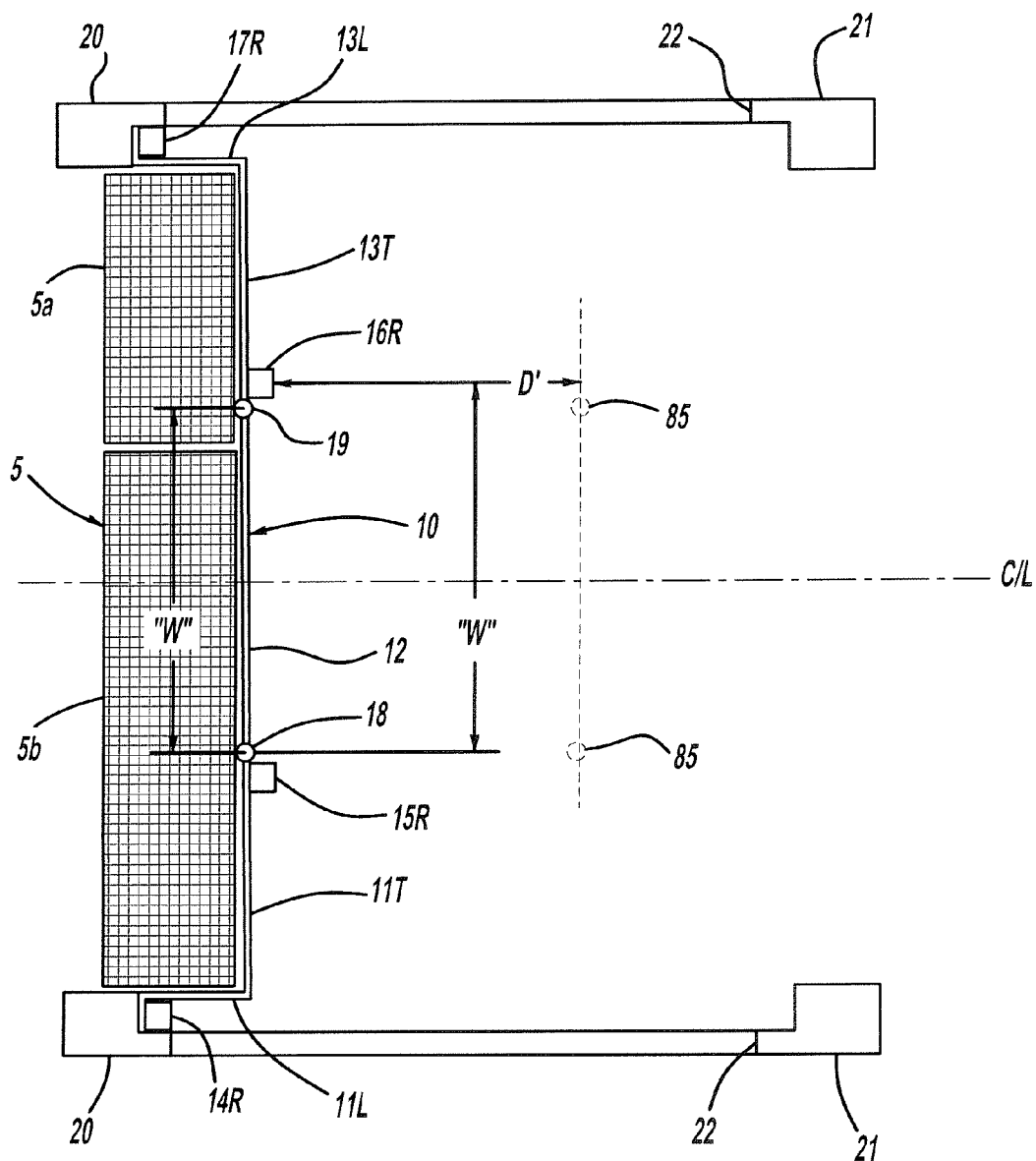
FIG. 9 is a schematic plan view corresponding to FIG. 5.

The bulkhead 10 is U-shaped when it is latched in the forward position and the first and second end panels 11, 13 of the bulkhead 10, and in particular the wing portions 11L, 13L, extend longitudinally forwardly past the stowed second row seats 5 to positions where they are latched to the van 1 close to the b-pillars 20 as can be seen in FIG. 9.

Figure 18:
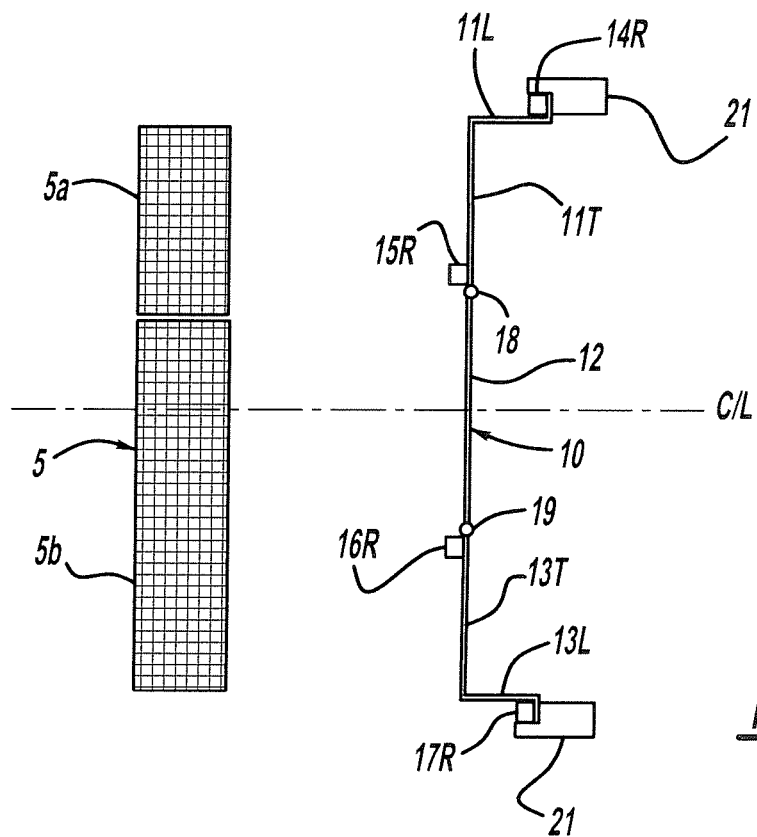
FIG. 18 is a schematic plan view showing the bulkhead fully transformed to the rear position with the second row of seats in the stowed position.
Figure 19:
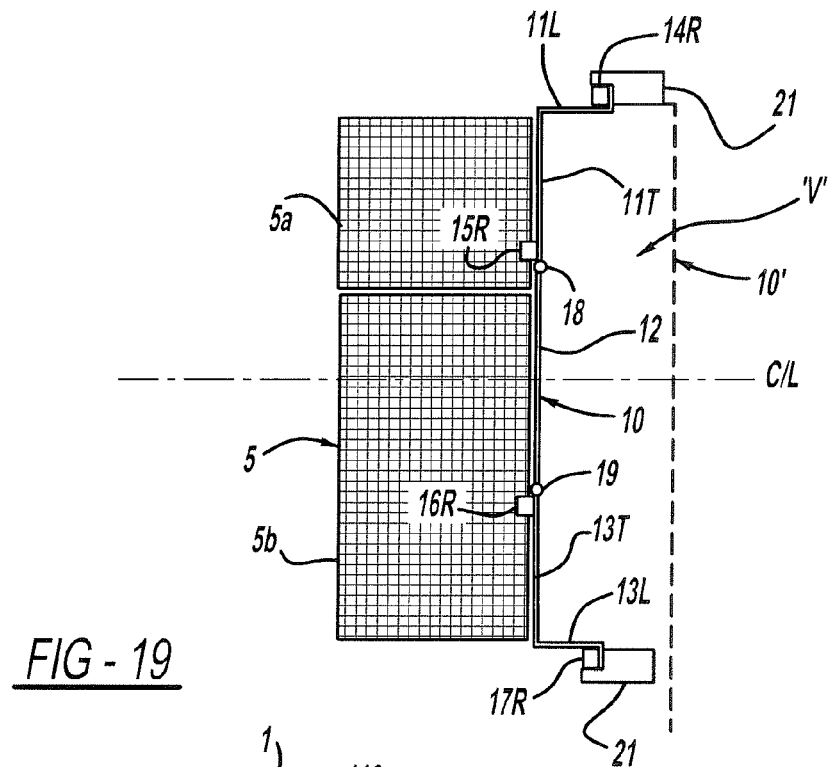
FIG. 19 is a schematic plan view showing the bulkhead fully transformed to the rear position with both of the seats forming the second row of seats in their "in-use" positions.

As before, to move or transform the bulkhead 10 from the forward position shown in FIG. 9 to the rear position as shown in FIGS. 18 and 19 requires the sequential unlatching, rotation and re-latching of the panels 11, 12 and 13.

In the example shown, the transformation starts with the unlatching of the first end panel 11 but it will be appreciated that it could start with the unlatching of the second end panel 13.

Figure 10:
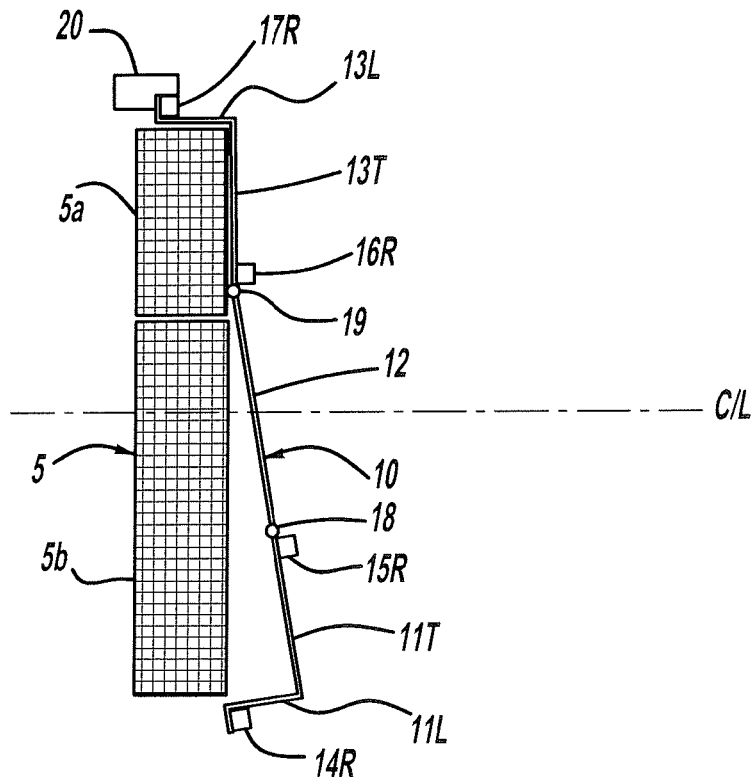
Figure 11:
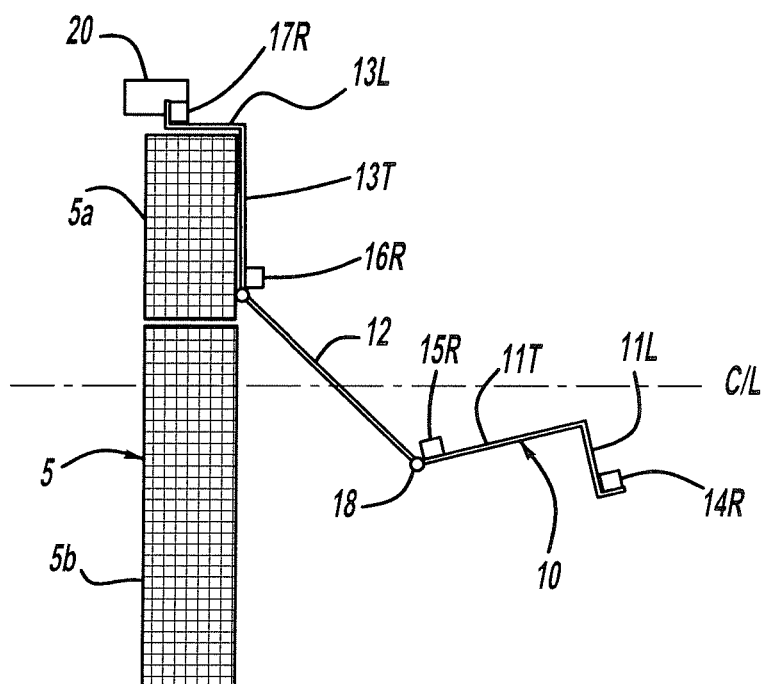
Figure 12:
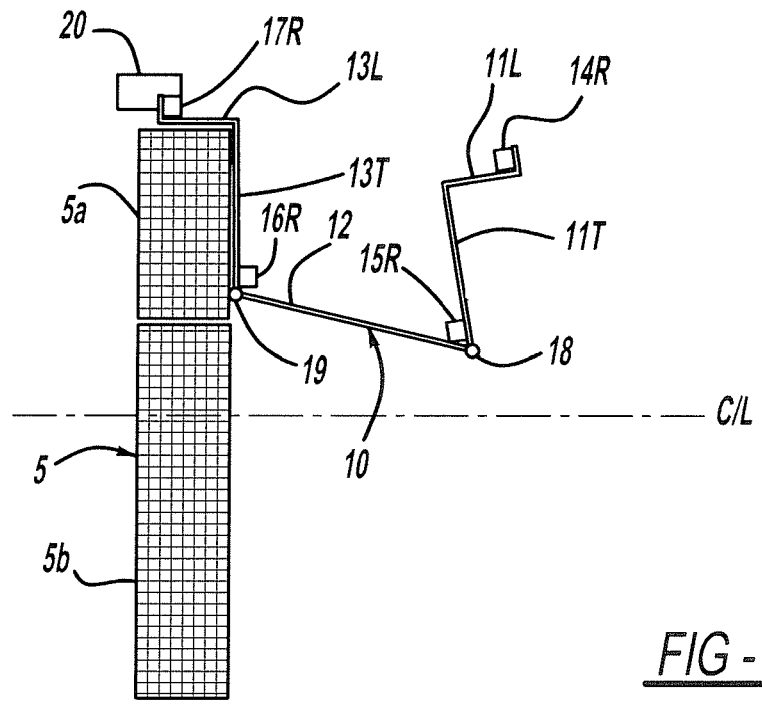
Figure 13A:
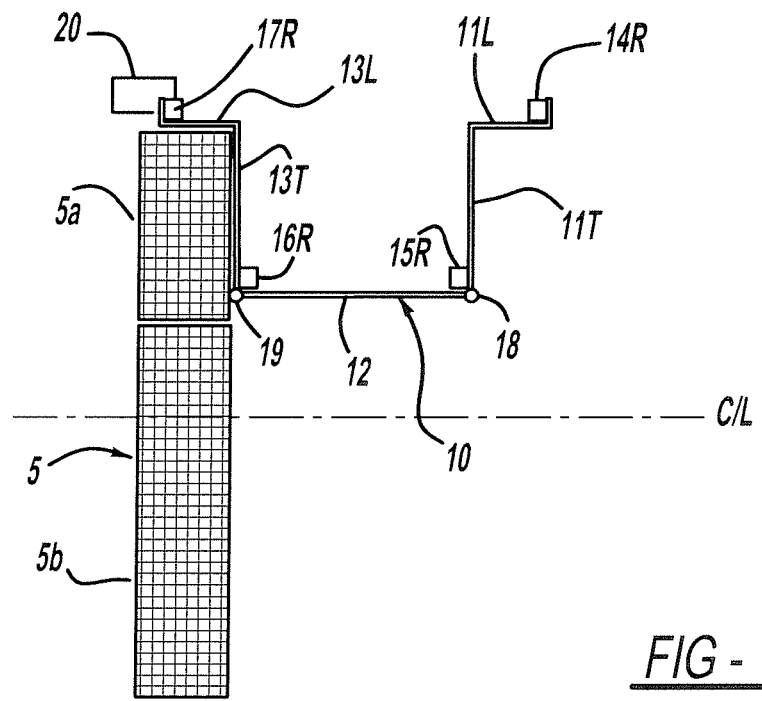

The first step is to un-latch the first end panel 11 by releasing the latches 14R, 14F, 15R and 15F so as to permit the respective end panel 11 and the middle panel 12 to be rotated about the pivot axis 19 relative to the second end panel 13 and rotate the first end panel 11 about the pivot axis 18 relative to the middle panel 12 as shown in FIGS. 10 and 11. The un-latched first end and middle panels 11 and 12 are then rotated into a position that enables the first end panel 11 to be re-latched to the van 1 on the same side of the van 1 as the second end panel 13 as shown in FIGS. 12 and 13a. The first end panel 11 is then secured to the van 1 by re-latching the latches 14R, 14F, 15R, and 15F.

Figure 13B:
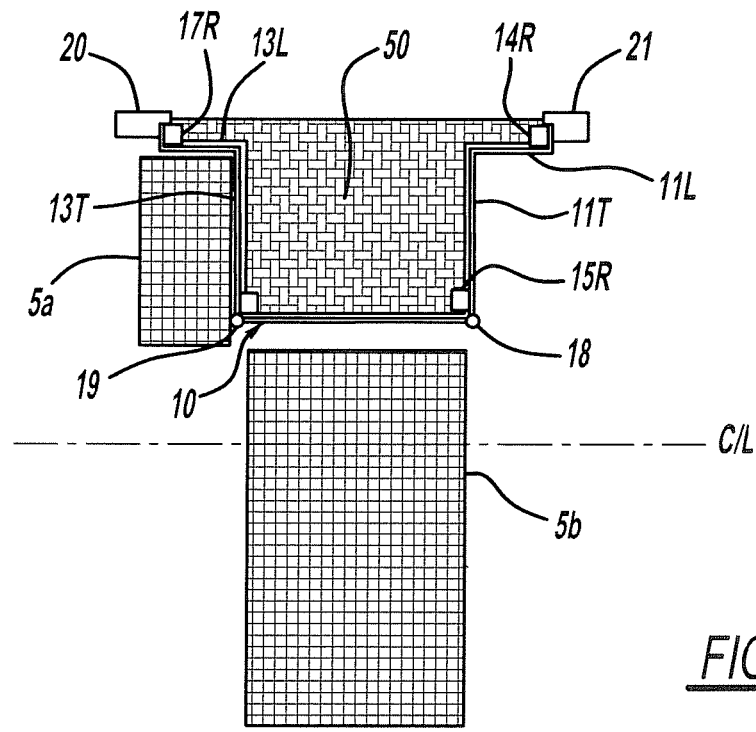
FIG. 13b is a schematic plan view corresponding to FIG. 7 showing the bulkhead transformed into the side locker with one of a pair of seats forming the second row of seats in an "in-use" position.
Figure 14:
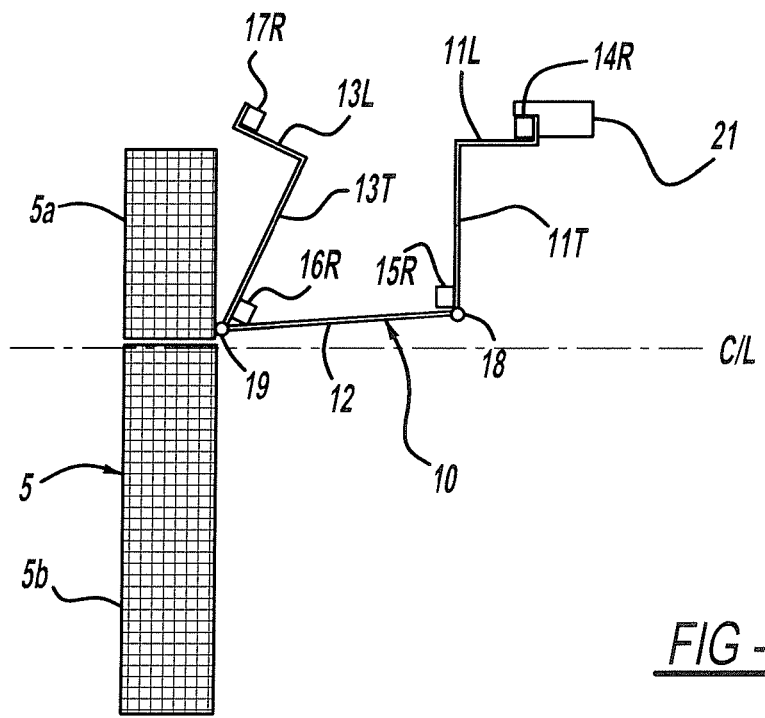
Figure 15:
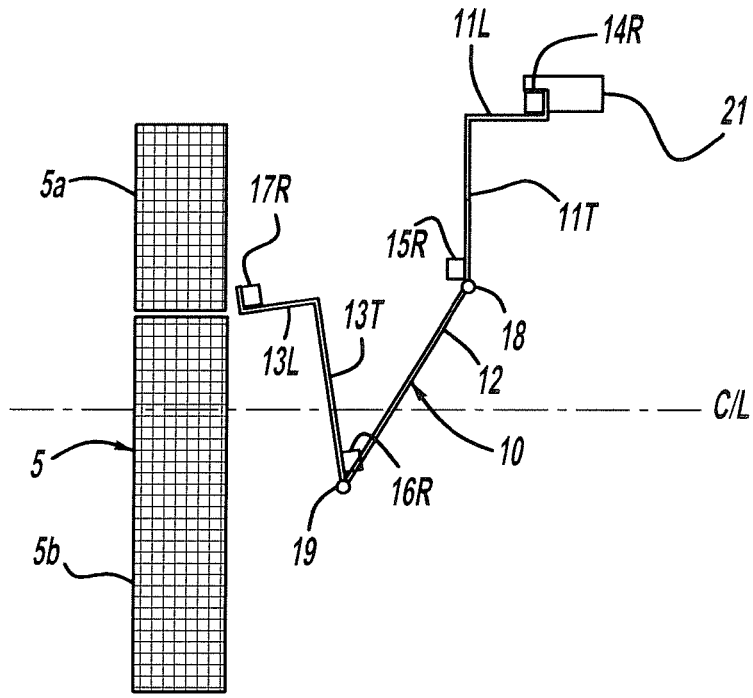
Figure 16:
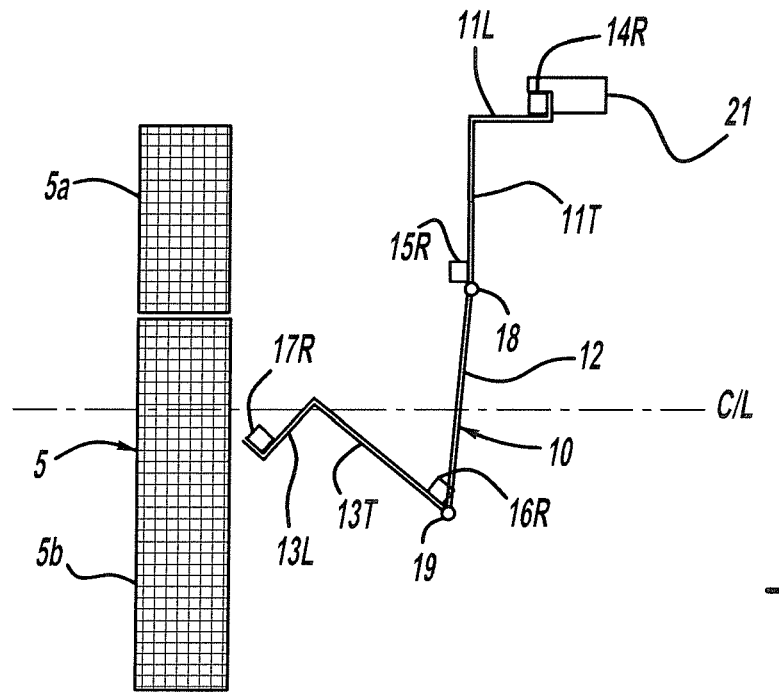
Figure 17:
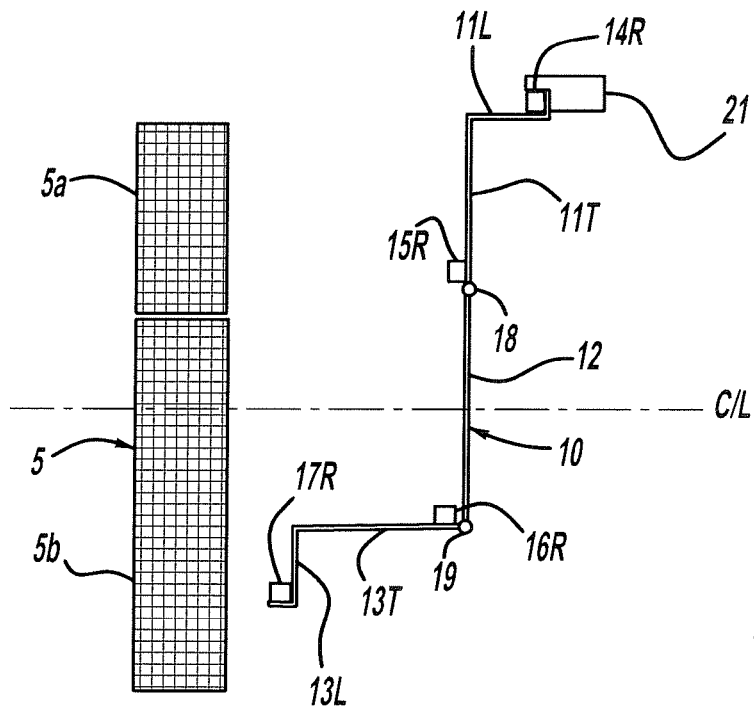

In this intermediate position as shown in FIG. 13b the bulkhead 10 forms a side-locker 50. The side locker 50 is located so as to be accessible via an adjacent side cargo door (not shown on FIG. 13b) and separates a cargo carrying area within the side-locker 50 from the passenger compartment of the van 1.

The side locker 50 arrangement also permits one of the two seats 5a, 5b forming the second row seats 5 to be moved to its "in-use" position thereby permitting increased passenger carrying capacity while maintaining a positive separation from any articles carried in the side locker 50.

When the bulkhead 10 is latched in this side locker position, each of the wing portions 11L, 13L of the first and second end panels 11, 13 is arranged longitudinally with respect to the van 1, the body portions 11T, 13T of the end panels 11, 13 are arranged transversely with respect to the van 1 and the middle panel 12 is arranged longitudinally with respect to the van 1.

From the side locker position the bulkhead 10 is transformed to the rear position as shown in FIGS. 14 to 17 by unlatching the second end panel 13 and rotating it about the pivot axis 19 and rotating the middle panel 12 about the pivot axis 18 so as to permit the second end panel 13 to move to a position where it can be re-latched to the van 1 in a corresponding position on an opposite side of the van 1 to the position where the first end panel 11 is latched as shown in FIG. 18. The second end panel 13 is then secured to the structure of the van 1 by re-latching the latches 16R, 16F, 17R and 17F.

Therefore, when the bulkhead 10 is located in the rear position, the bulkhead 10 is latched to the van 1 near to a left hand outer end by the upper and lower latches 17R and 17F at a position close to the c-pillar 21 on a left-hand side of the van 1 and the bulkhead 10 is latched to the van 1 near to a right hand outer end by the upper and lower latches 14R and 14F at a position close to the c-pillar 21 on a right-hand side of the van 1.

As before, and as shown in FIG. 19, when the bulkhead 10 is latched in the rear position it is U-shaped and the end panels 11, 13 of the bulkhead 10 extend longitudinally rearwardly away from the "in-use" second row seats 5.

As shown on FIG. 19 the volume 'V' is the volume gained by transforming the bulkhead 10 compared to a simple sliding of the bulkhead 10. That is to say the line 10' represents the position of the middle panel 12 and the body portions of the end panels 11, 13 if the bulkhead 10 was simply to be slid back from its forward position.

Referring now to FIGS. 20a to 22f there is shown a moveable bulkhead 110 for a motor vehicle such as the van 1 previously described which has a pair of front passenger doors (not shown), a pair of side hinged rear cargo doors (not shown), a side cargo door on each one side of the van 1 (not shown on the left hand side), a pair of b-pillars 20, one on each side of the van 1, each of the b-pillars 20 defining a front edge of an aperture 22 in a side of the van 1 and a pair of c-pillars 21, one on each side of the van 1 to the rear of the respective b-pillar 20 defining a rear edge of the aperture 22. Each of the apertures 22 defines a cargo loading aperture that is closed off by a respective side cargo door when the side cargo door is in a closed position.

The van 1 and the bulkhead 110 are much as described before and the moveable bulkhead 110 comprises a first end panel 111 (having as before transverse and longitudinal portions 111T and 111L) which extends forwardly when the bulkhead 110 is latched in the forward position in the van 1 and extends rearwardly when the bulkhead 110 is latched in the rear position, a second end panel 113 (having as before transverse and longitudinal portions 113T and 113L) which extends forwardly when the bulkhead 110 is latched in a forward position in the van 1 and extends rearwardly when the bulkhead 110 is latched in the rear position and a middle panel 112 which is hingedly connected at one end to the first end panel 111 and is hingedly connected at an opposite end to the second end panel 113.

The only significant difference between the bulkhead shown in FIGS. 20a to 22f and that shown and described in FIGS. 5 to 19 is the shape of the end panels 111 and 113 which are not simple oblongs but taper in towards their upper ends so as to conform to the interior shape of the van 1 and have flanges 111f and 113f which are used to mate with seals located on the van 1 or carry seals so as to mate with the body structure of the van 1. The width of the middle panel 112 is as before substantially the same as the distance between the forward and rear positions so as to allow the bulkhead 110 to be transformed and re-secured.

Figure 20A:
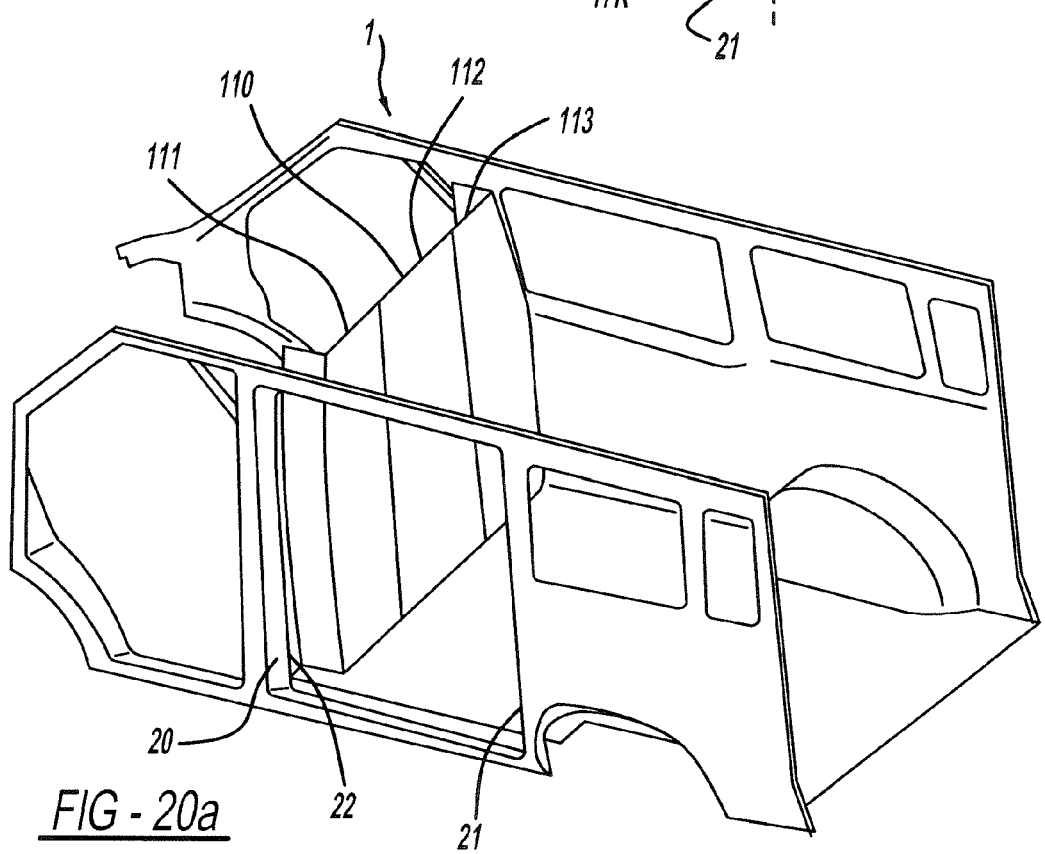
FIG. 20a is a pictorial view of the motor vehicle showing a preferred embodiment of a moveable bulkhead in a forward position.
Figure 20B:
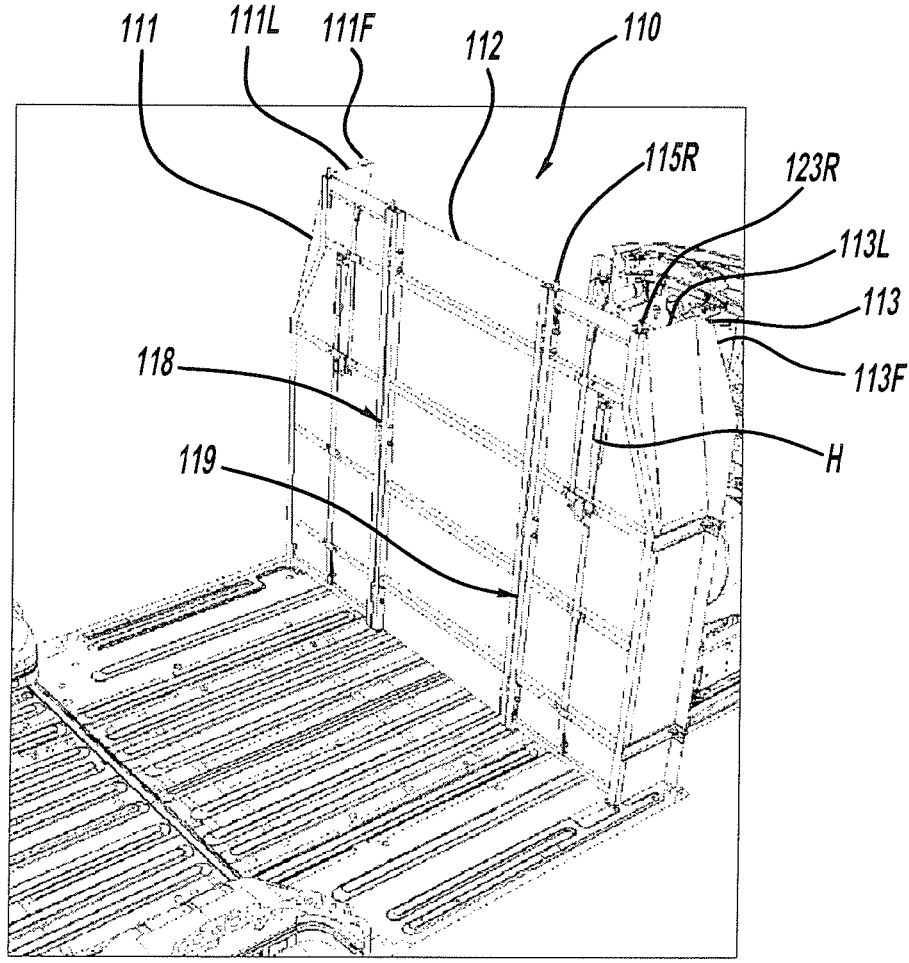
Figure 21A:
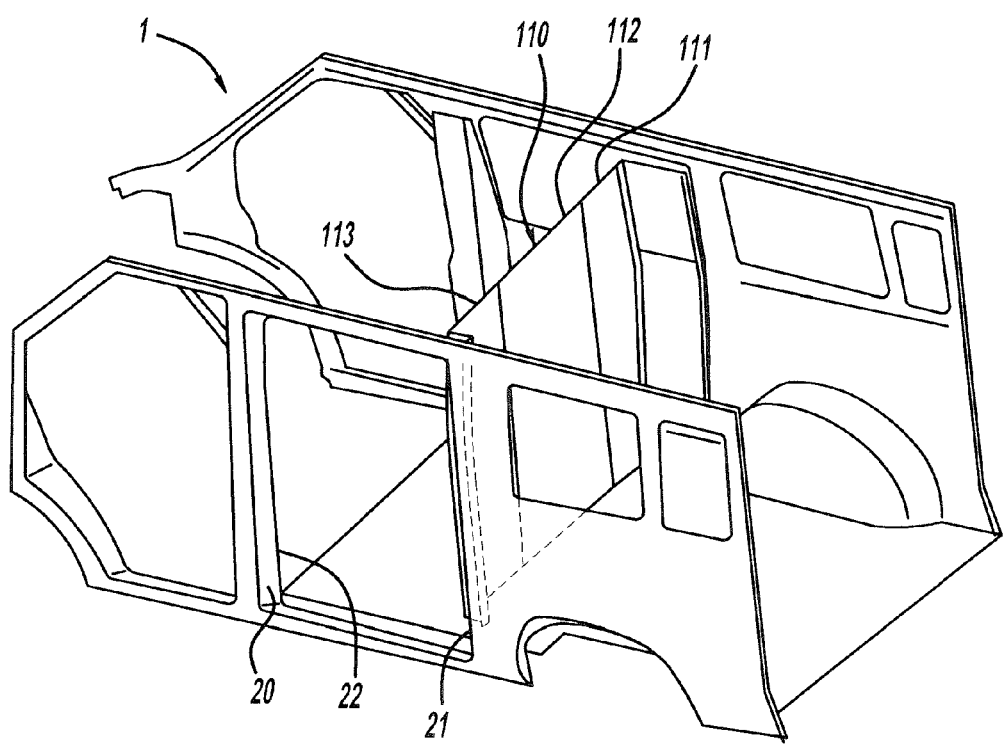
FIG. 21a is a view similar to FIG. 20a but showing the bulkhead transformed to a rear position.
Figure 21B:
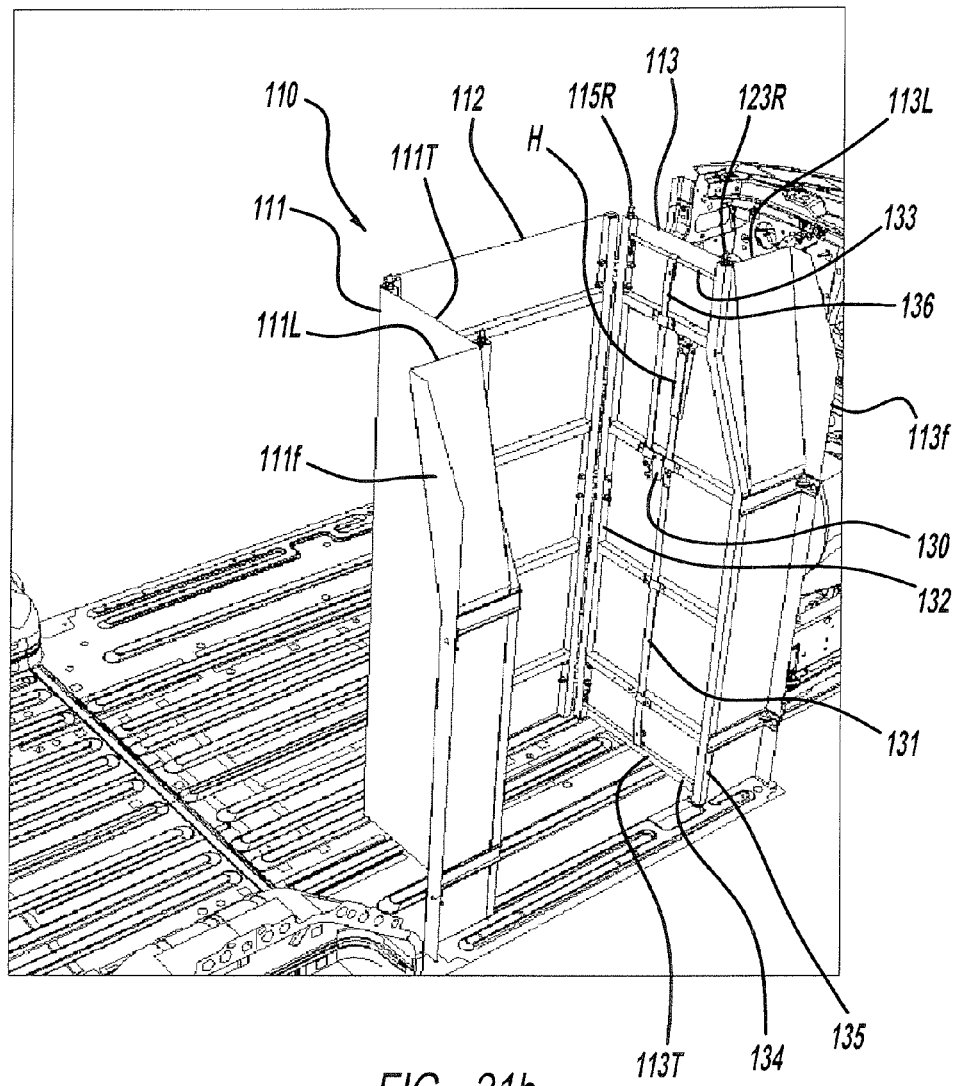
Figure 21C:
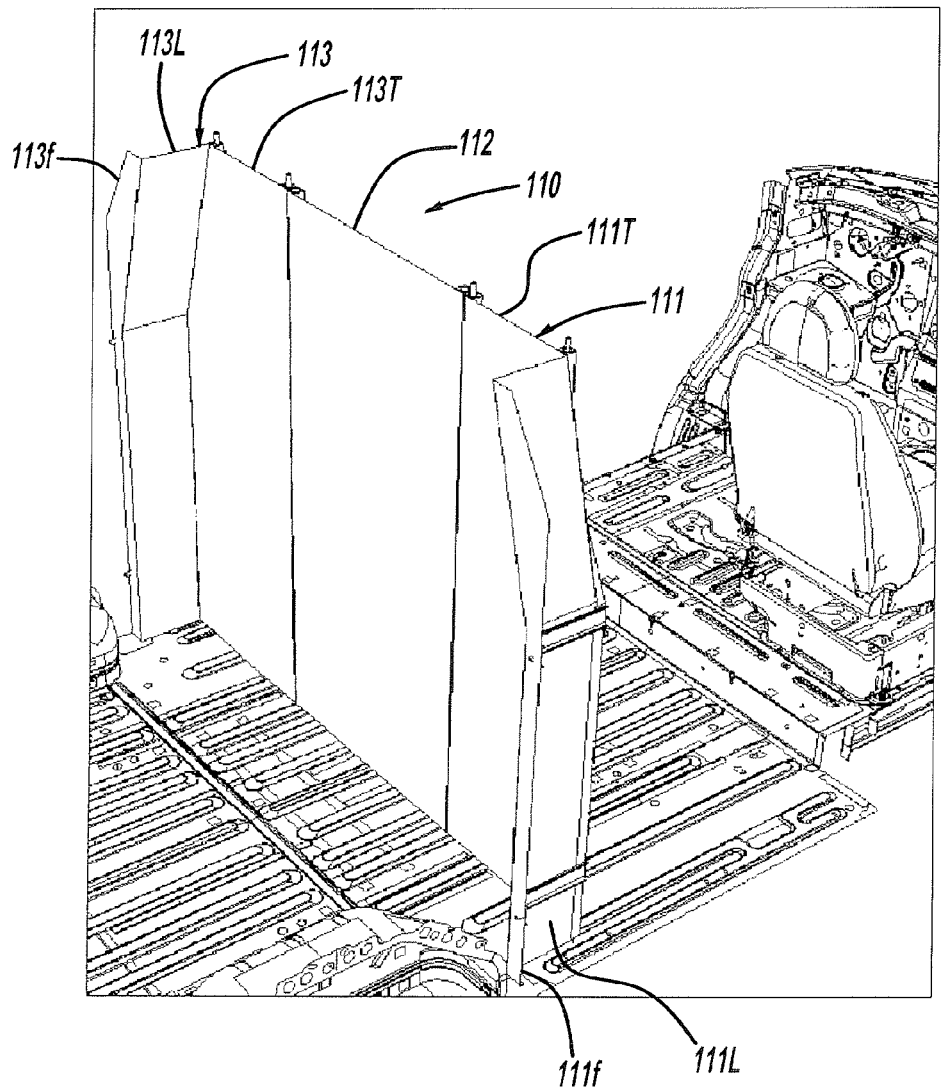

In FIGS. 20a and 20b the bulkhead 110 is shown in its forward position and in FIGS. 21a and 21c the bulkhead 110 is shown in its rear position. In FIG. 21b the bulkhead 110 is shown in its side locker position.

As before, the method by which the desired bulkhead transformation distance is achieved is by varying the width of the middle panel 112. This is because the width of the middle panel 112 corresponds approximately to the distance by which the bulkhead 110 moves when it is transformed from its forward location to the rear location. That is to say, the distance between the hinge axes 118 and 119 on either side of the middle panel 112 is substantially equal to the distance between the securing positions of the bulkhead 110 in its forward and rear positions, so that when the middle panel 112 is rotated though 90 degrees the bulkhead 110 can be re-latched to the vehicle 1 in the other position. It will be appreciated that there is a minor adjustment to this correlation as a result of the plan-view offsets between the hinge axis 118 and 119 and the adjacent latch pins.

The transformation of the bulkhead 110 is as for the bulkhead 10 and so will not be described again in detail.

With reference to FIG. 22 there is shown an alternative bulkhead 10 to that shown in FIG. 5. As before, the bulkhead 10 comprises first and second end panels 11 and 13 each of which extends forwardly when the bulkhead 10 is latched in the forward position in the van 1 as shown in FIG. 22 and extends rearwardly when the bulkhead 10 is latched in the rear position in the van 1.

Each of the first and second end panels 11 and 13 has wing portions 11L, 13L that are arranged longitudinally with respect to the van 1 when the bulkhead 10 is latched in the van 1 in either of the forward and rear positions and body portions 11T, 13T that are arranged transversely with respect to the van 1 when the bulkhead 10 is latched in the van 1 in either of the forward and rear positions.

The first end panel 11 is hingedly connected to a middle panel 12 by a number of hinges (not shown) so as to permit the first end panel 11 to pivot relative to the middle panel 12 about a vertical pivot axis 18 and the second end panel 13 is hingedly connected to the middle panel 12 by a number of hinges (not shown) so as to permit the second end panel 11 to pivot relative to the middle panel 12 about a vertical pivot axis 19.

The bulkhead 10 includes a latching system including a number of latches 14, 15, 16, 17, 23, 24 which comprise an upper set of latches 14R, 15R, 16R, 17R, 23R and 24R which are arranged in use to be selectively engageable with a roof member of the van 1 and a lower set of latches 14F, 15F, 16F, 17F, 23F and 24F which are arranged in use to be selectively engageable with a floor structure of the van 1.

A primary difference between the bulkhead shown in FIG. 5 and the bulkhead shown in FIG. 22 is that the bulkhead shown in FIG. 5 has end panels that are of a fixed "L" shape whereas the bulkhead shown in FIG. 22 has a first end panel 11 having a wing portion 11L hingedly connected to a body portion 11T for rotation about a vertical axis 25 and a second end panel 13 having a wing portion 13L hingedly connected to a body portion 13T for rotation about a vertical axis 26. One advantage of this arrangement is that the bulkhead 10 can be folded into a smaller package if it needs to be removed from the van 1.

With reference to FIG. 23 there is shown a bulkhead 10 which is the same as that shown in FIG. 5 with the exception that the middle panel is formed as first and second middle panels 12a, 12b that are hingedly connected together for rotation about a pivot axis 27 and that three locks 28a, 28b and 28c are used to prevent rotation of the first and second middle panels 12a, 12b relative to one another during normal use. The locks 28a, 28b and 28c can be released when it is required to fold up the bulkhead 10 during installation or removal from the van 1.

With reference to FIG. 24 there is shown a bulkhead 10 that combines the features described with reference to FIGS. 22 and 23 and for which the same reference numerals and the same functionality applies. Such a bulkhead 10 is very compact when folded up for installation, removal or storage.

With reference to FIG. 25 there is shown an alternative bulkhead 210 which is similar to that shown in FIGS. 5 to 8 having a middle panel 212 pivotally connected for rotation about pivot axes 218, 219 to first and second end panels 211 and 213 but instead of the end panel 211 and 213 being L-shaped they are flat or planar end panels 211, 213. As before the bulkhead 210 is transformable from a forward position to a rear position by a folding operation not a sliding operation and the width of the middle panel 212 is substantially the same as the distance between the forward and rear locations of the bulkhead 210.

As before, upper latches 214R, 215R, 216R and 217R are used to secure the bulkhead 210 to a roof structure of the van 1 and lower latches 214F, 215F, 216F and 217F are used to secure the bulkhead 210 to the floor structure of the van 1.

As noted above, the bulkheads 10 and 110 include a latch system including an upper set of latches arranged to be selectively engageable with a roof cassette 232 attached to the roof of the van 1 and a lower set of latches arranged to be selectively engageable with the floor cassette 6 attached to the floor of the van 1. According to the preferred embodiment of the disclosed invention, the roof cassette 232 and the floor cassette 6 are attached to the roof of the van 1 and to the floor of the van 1 by mechanical fasteners (such as nuts and bolts) or welding. (According to an alternate embodiment, the roof cassette 232 and the floor cassette 6 may be formed integral with the roof and floor respectively.)

Because according to the preferred embodiment the roof cassette 232 and the floor cassette 6 are attachable accessories, they facilitate attachment of the movable bulkheads 10 and 110 to a given vehicle structure without requiring changes to the vehicle structure itself. Regardless of the embodiment, the function of the roof cassette 232 and the floor cassette 6 is to geometrically link the position(s) of the bulkheads 10 and 110 and the seats 5 to the position of the fixings in the van 1 and to therefore transmit any loads from the bulkheads 10 and 110 and the seats 5 into the structure of the van 1 itself.

Figure 26:
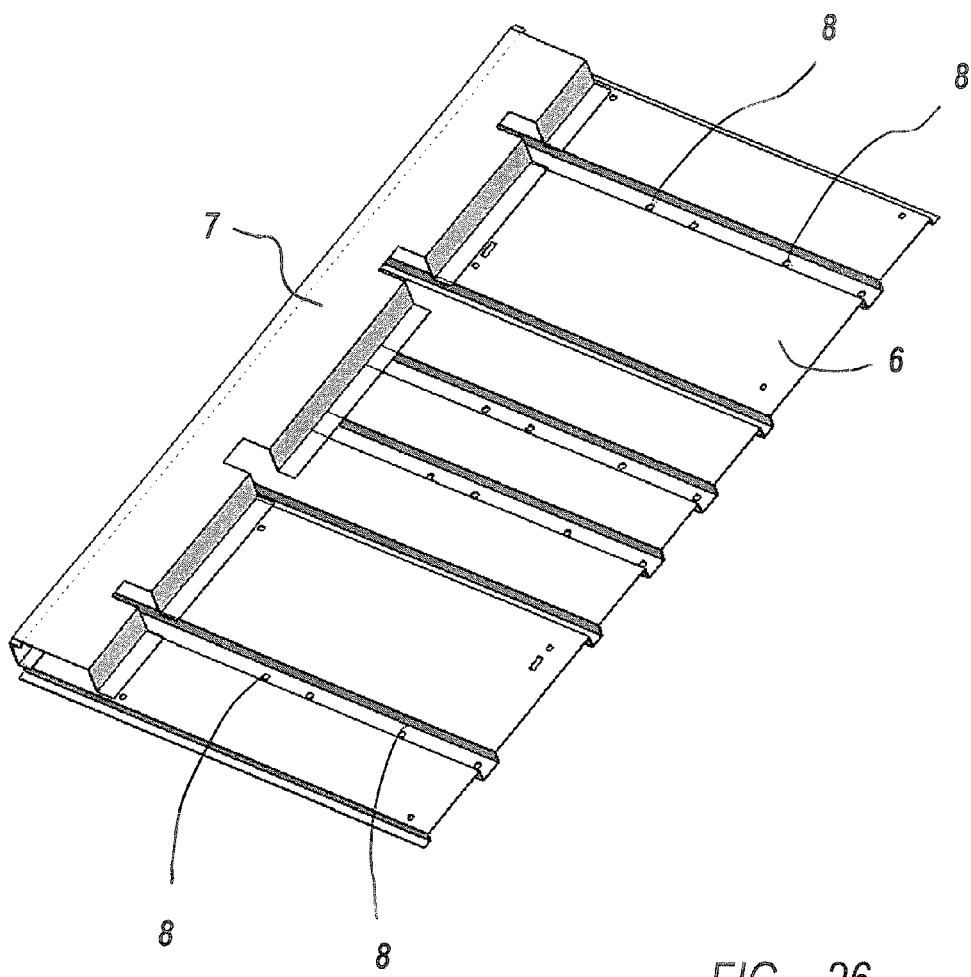
FIG. 26 is a schematic pictorial view of the floor cassette of the motor vehicle of FIG. 3.

The floor cassette 6, as illustrated in FIG. 26, provides the bulkheads 10 and 110 as disclosed herein and the seats 5 with a base for attachment. The floor cassette 6 further includes seat tubs for both an in-use position as well as a stowed position. The floor cassette 6 has fastener locations for fixing standard seats 5. Thus provided, the seats 5 may be fastened (for example, by use of nuts and bolts) in any of several patterns, thus providing considerable versatility over the fastener pattern conventionally provided in the van floor. The bulkhead latches (described below) are also fixed to the floor cassette 6.

The floor cassette 6 includes a waterfall edge 7 as is known in the art and a plurality of mounting holes 8 to provide bulkhead fixing points.

Figure 27:
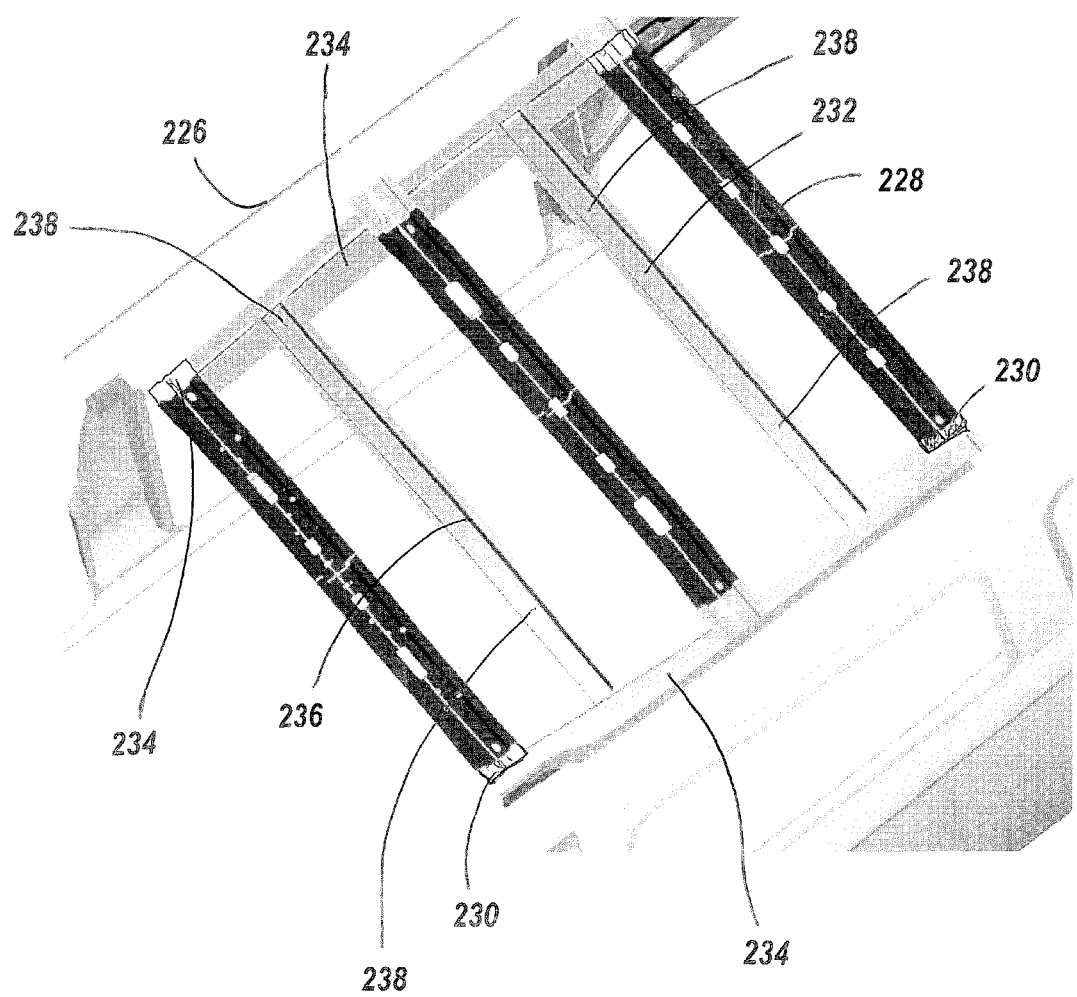
FIG. 27 is a schematic pictorial view of the roof cassette of the disclosed invention attached to the vehicle roof.

The roof structure of the van 1 for use with the various embodiments of the moveable bulkhead of the disclosed invention is illustrated in FIG. 27 in which a schematic pictorial view of the upper portion of the vehicle is shown. The upper portion of the vehicle includes a roof 226 having a plurality of roof bows 228 extending between respective roof bow gussets 230 as is known in the art.

The roof cassette 232 is attached to the vehicle roof for attachment of the upper ends of the moveable bulkheads 10 and 110. The roof cassette 232 includes a pair of opposed side rails 234 and a plurality of cross rails 236. Each cross rail 236 includes a plurality of bulkhead latch pockets 238. The roof cassette 232 is attached to the roof bow gussets 230 by fasteners such as J-nuts, although other fasteners may be used. It is to be understood that while the roof cassette 232 is illustrated as consisting of the pair of opposed side rails 234 and the plurality of cross rails 236, the roof cassette 212 may alternatively be a one-pieced stamping similar to the floor cassette 6.

While a preferred method of attaching the roof cassette 232 to the vehicle roof 226 is shown in FIG. 27, it may not always be possible for the roof cassette 232 to be attached to the roof bow gussets 230. Accordingly, alternative methods of attachment of the roof cassette to the roof 226 are provided. Two such examples, set forth for illustrative purposes and not intended as being limiting, are shown in FIGS. 28 and 29 and are discussed in conjunction therewith.

Figure 28:
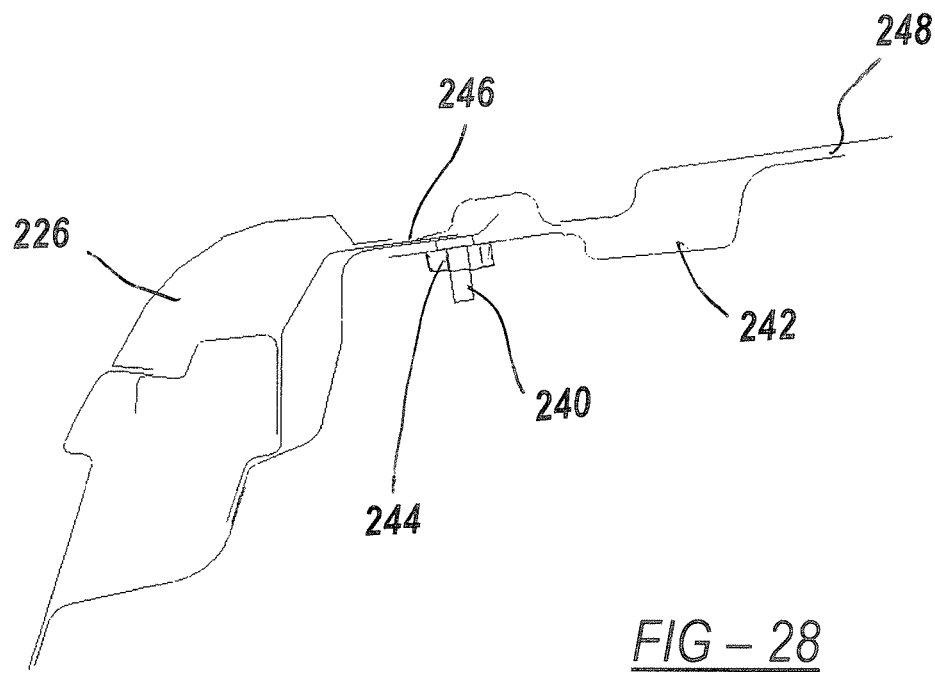
FIG. 28 is a sectional view of a portion of the roof cassette fixing strategy according to a first alternate embodiment of the disclosed invention.

With respect to FIG. 28, a sectional view of a portion of the roof cassette fixing strategy according to a first alternate embodiment of the disclosed invention is shown. According to this embodiment, several weld studs are attached to the underside of the roof 226 and a roof cassette is attached to the studs. As shown in FIG. 28, one of these studs, a weld stud 240 is shown attached to the underside of the roof 226. A roof cassette 242 is attached to the underside of the roof 226 by fitting to the weld stud 240. A nut 244 holds the roof cassette 242 in place against the weld stud 240. The attachment of the roof cassette 242 to the underside of the roof 226 is configured such that gaps 246 and 248 are left between the roof 226 and the roof cassette 242 within which an adhesive sealant is provided to provide additional fixation and for sound deadening. The gaps 246 and 248 may vary in dimension although a 5 mm gap is a suggested.

Figure 29:
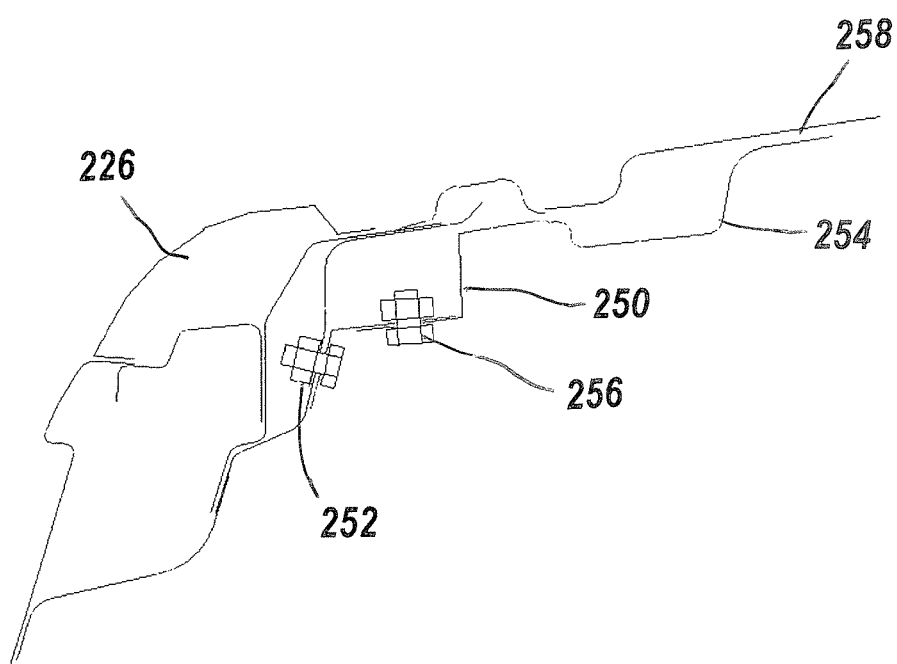
FIG. 29 is a sectional view of a portion of the roof cassette fixing strategy according to a second alternate embodiment of the disclosed invention.

Another alternative to attaching the roof cassette to the roof gussets is shown in FIG. 29. As illustrated, an additional cantrail bracket 250 is attached to the roof 226 by a fastener 252. A roof cassette 254 is attached to the cantrail bracket 250 by a fastener 256. A gap 258 is provided between the attached roof cassette 254 and the roof 226 within which the adhesive sealant is provided.

With reference to FIGS. 30a to 30f there is shown in greater detail the first end panel 111 and in particular a latching mechanism used to selectively latch the first end panel 111 to the van 1. The second end panel 113 is not shown but the middle panel 112 is shown hingedly connected to the first end panel 111 for rotation about a vertical axis 118. It will be appreciated that in practice the latching mechanism may be concealed from view by an outer skin of the first end panel 111.

The locking mechanism comprises first and second upper latches 115R and 123R which are provided to secure an upper edge of the first end panel 111 to part of a roof structure of the van 1 and first and second lower latches 115F and 123F which are provided to secure a lower edge of the first end panel 111 to part of a floor structure of the van 1.

All of the latches 115R, 123R, 115F and 123F are moved simultaneously by a single actuating handle "H" pivotally connected to part of the structure of the panel 111. The handle "H" is connected to an upper end of a master control link 138 such that rotation of the handle "H" in an upward direction will cause the master control link 138 to be raised and rotation of the handle "H" in a downward direction will cause the master control link 138 to be lowered. The master control link or rod 138 is driveably connected to a transfer lever 130. When the handle "H" is rotated downwards the transfer lever 130 is rotated in the direction of the arrow "L" shown on FIG. 30e and all of the latches 115R, 123R, 115F and 123F are moved to their latched positions and if the handle "H" is rotated in an opposite upward direction the transfer lever 130 rotates in an opposite direction and all of the latches 115R, 123R, 115F and 123F are moved to their unlatched positions.

Figure 30A:
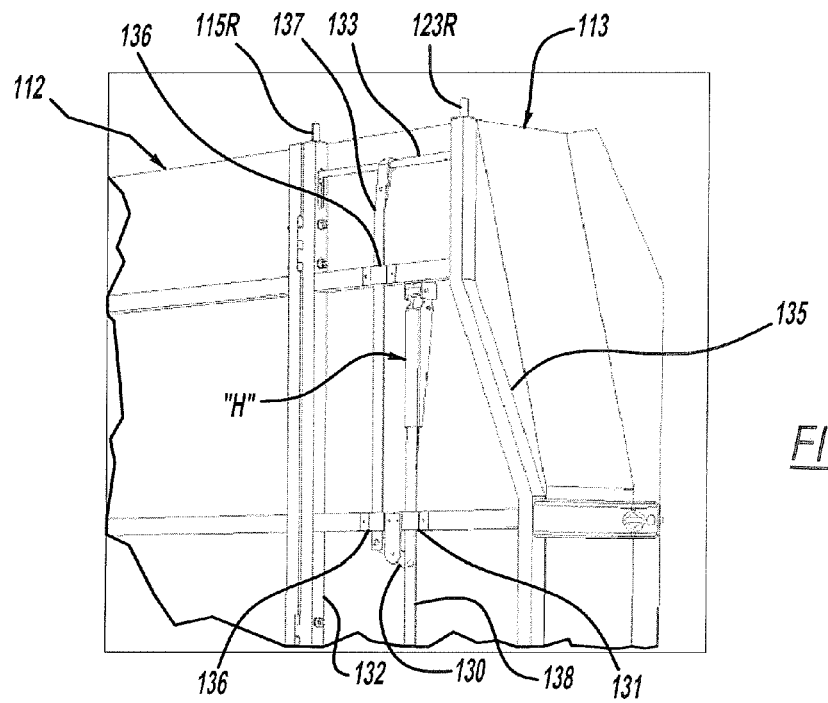
FIG. 30a is a view in the direction of arrow Z on FIG. 21a showing part of a securing mechanism for part of the bulkhead with latches in a latched state.
Figure 30B:
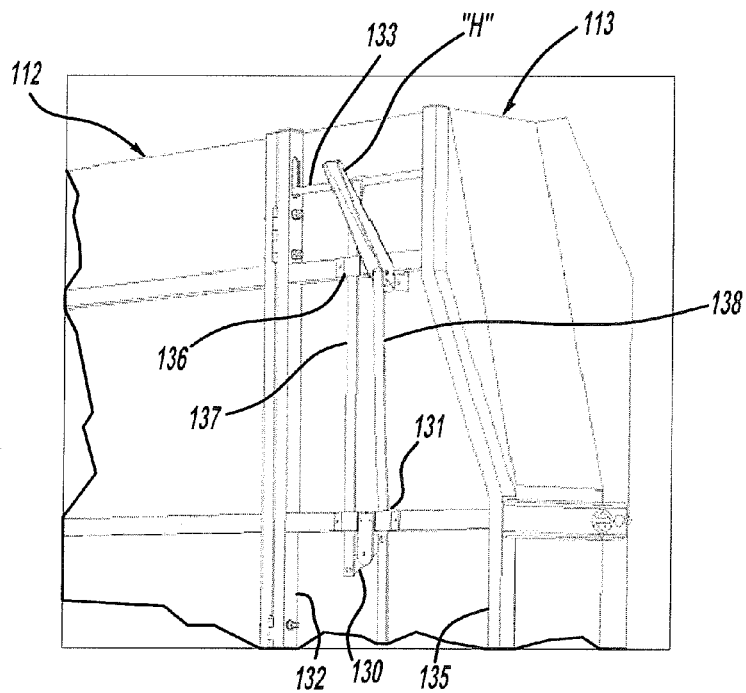
FIG. 30b is view similar to that of FIG. 30a but showing the latches in an unlatched state.
Figure 30E:
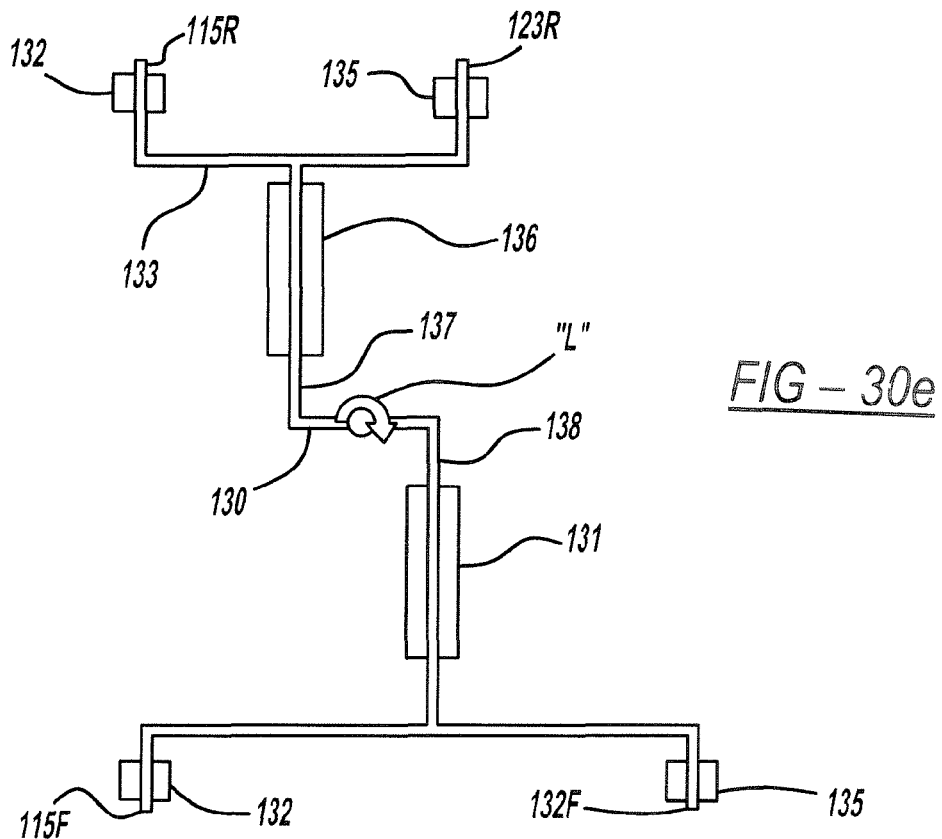
FIG. 30e is a schematic diagram of the securing mechanism shown in FIGS. 30a to 30c.

With reference to FIG. 30e the transfer lever 130 is connected at one end to an upper actuator rod 137 slidingly supported at a number of positions 136 by the support structure of the end panel 111. An upper end of the upper actuator rod 137 is connected to an upper transfer rod 133 which is used to connect the first and second upper latches 115R and 123R to the master lever 130. The first and second upper latches 115R and 123R are slidingly supported in upper ends of two support tubes 132, 135.

The opposite end of the transfer lever 130 is connected to the master control rod 138 which forms a lower actuator rod that is slidingly supported at a number of locations 131 by part of the structure of the panel 111. A lower end of the lower actuator rod 138 is connected to a lower transfer rod 134 which is used to connect the first and second lower latches 115F and 123F to the transfer rod 130. The first and second lower latches 115F and 123F are respectively slidingly supported in lower ends of the two support tubes 132, 135.

Therefore, if the handle "H" is moved downwards so as to cause the transfer lever 130 to be rotated in the direction of arrow "L", the upper actuator rod 137 will move upwards and the lower actuator rod 138 will move downwards thereby simultaneously engaging all of the upper and lower latches 115R, 123R and 115F, 123F and, conversely, if the handle "H" is moved in an opposite direction the transfer lever 130 will cause the upper actuator rod 137 to move downwards and the lower actuator lever 138 to move upwards thereby simultaneously disengaging all of the upper and lower latches 115R, 123R and 115F, 123F. Therefore a single handle "H" is used to latch and unlatch all of the latches 115R, 123R and 115F, 123F. A similar latching mechanism is used to selectively secure the second end panel 113.

With particular reference to FIG. 30d a further feature of this embodiment can be seen in greater detail. The first and second lower latches 115F, 123F both have a flange 139 formed thereon. Only the second lower latch 123F and its associated flange 139 are shown but the first latch 115F is constructed identically.

The flange 139 is provided to contact the floor structure 140 of the van 1 as the latch 123F is moved towards its fully latched position (as shown). This causes the first end panel 111 to be lifted away from the floor 140 as the latch 123R is moved to its fully latched position. A gap "G" of approximately 5 to 10 mm therefore is present between a lower edge of the end panel 111 and the floor 140 whenever the latch 123F is in its fully latched position.

A similar arrangement is used for all of the latches used to latch or secure the bulkhead 110 to the van 1 so that when ever these latches are fully latched the corresponding panel is raised away from the floor 140 thereby allowing the bulkhead 110 to be more easily transformed than would be the case if the bulkhead 110 rested upon the floor 140.

Figure 30F:
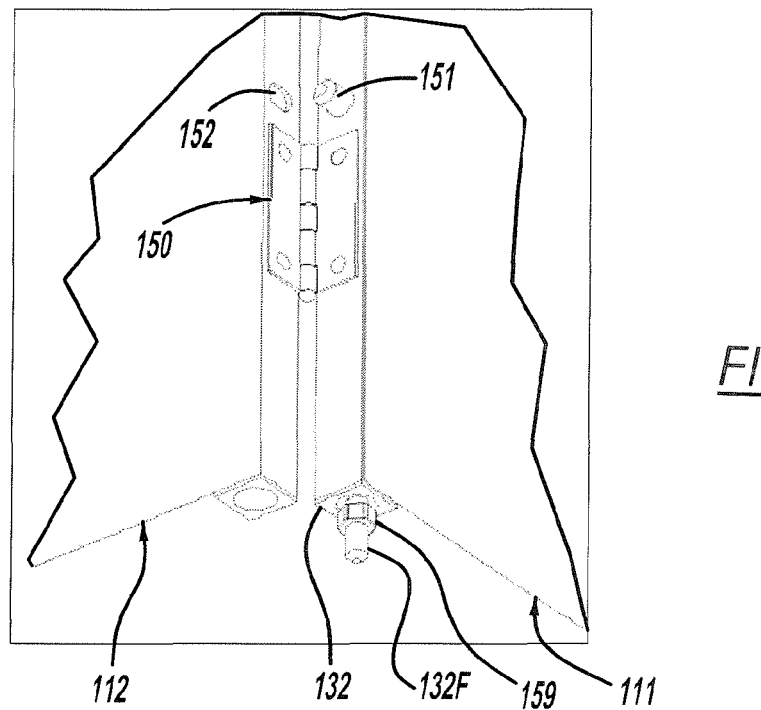
FIG. 30f is an enlarged view of a second embodiment of a latch.

A first alternative to the use of flanges 139 is shown in FIG. 30f. Each of the latches is provided with a shoulder that acts on the floor and lifts the bulkhead 110 in the form of a nut 159 threadingly engaged with each rod 123F forming a latch so as to form a shoulder on the latch 123F.

FIG. 30f also shows how adjacent panels 111, 112 are keyed together or connected by means of an interlocking system comprising a number of pegs 151 projecting out of one of the two panels for engagement with corresponding apertures 152 formed in an edge of the adjacent panel. It will be appreciated that there will be a number of such peg 151 and aperture 152 connections and that they will also be present between the middle panel 112 and the other end panel 113. These connections transfer load between the adjoining panels when the pegs 151 are brought into engagement with the apertures 152. Because the interlocking system of the disclosed invention provides for the secure engagement of one panel to the adjacent panel upon rotation of either or both of the panels on the pivot axis no additional latching is necessary between the panels to effect secure engagement, thus avoiding additional hardware expense and user complication.

As a third alternative (not shown) the latches could engage with depressions formed in the floor so that the latches act against the depressions and lift the bulkhead 110 clear of the floor.

A hinge 150 is also shown on FIG. 30f hingedly connecting the outer panel 111 to the middle panel 112 so as to form part of a pivotal connection therebetween. It will be appreciated that several such hinges 150 will be used to pivotally connect two panels together.

Figure 31:
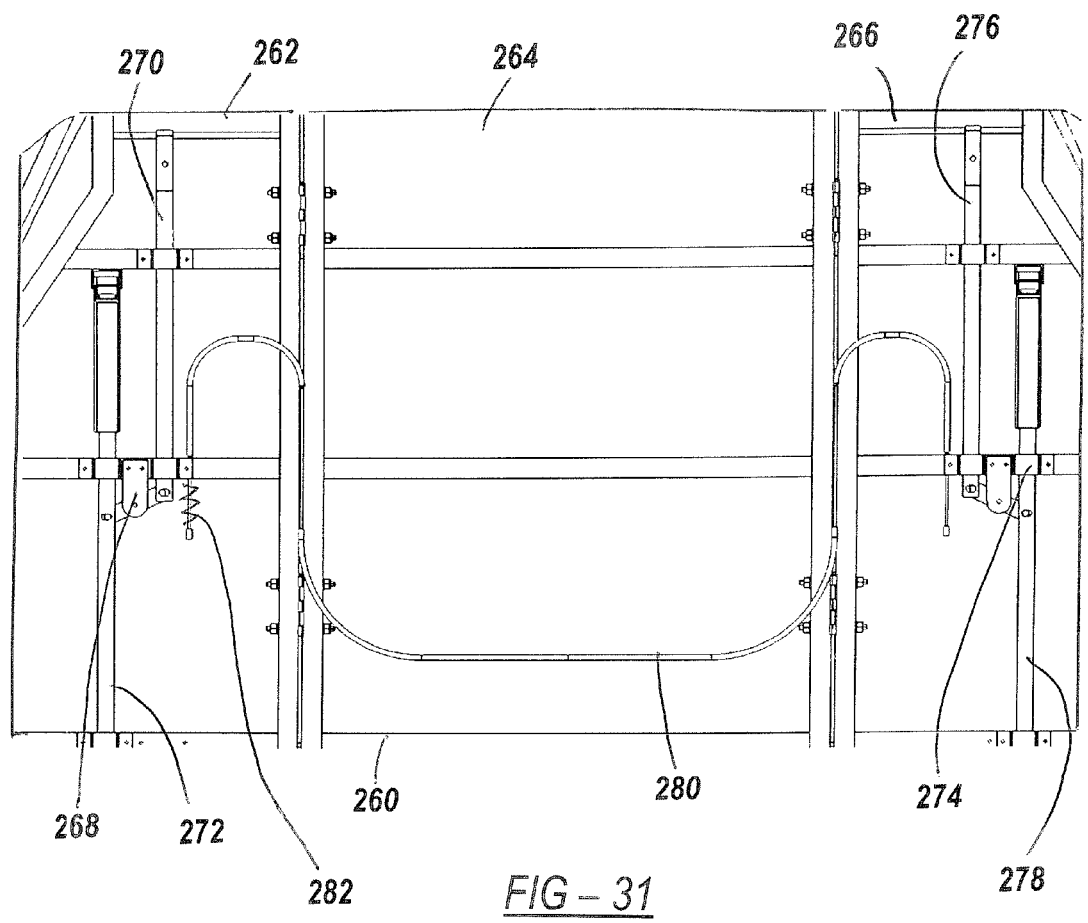
FIG. 31 is a view in the direction of arrow Z on FIG. 21a showing an alternate embodiment of a moveable bulkhead having a latch interlock mechanism.

As an additional aspect of the disclosed invention, interlock mechanisms are optionally provided to avoid the simultaneous unlatching of bulkhead latches on panels of the same moveable bulkhead. One embodiment of such an interlock mechanism is shown in FIG. 31 which illustrates a side of a moveable bulkhead 260. The bulkhead 260 includes a first side panel 262, a middle panel 264, and a second side panel 266. The first side panel 262 includes a latching mechanism 268 having an upper latch 270 and a lower latch 272. The second side panel 266 includes a latching mechanism 274 having an upper latch 276 and a lower latch 278.

To prevent the unintentional simultaneous unlatching of the latch mechanisms 268 and 274 and the consequent movement of the bulkhead 260, a Bowden cable 280 connects the latch mechanism 268 with the latch mechanism 274. A spring 282 is provided in conjunction with the Bowden cable 280. By way of the Bowden cable 280, if either of the latch mechanisms 268 or 274 has been unlatched, tension of the Bowden cable 280 prohibits movement of the opposing latch. The spring 282 takes up the slack of the Bowden cable 280 in the event that both latch mechanisms 268 and 274 are latched.

Figure 32:
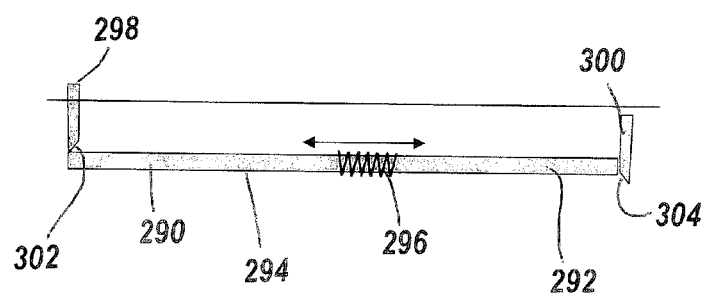
FIG. 32 is a diagrammatic view of an alternate embodiment of a latch interlock mechanism according to the disclosed invention.

Another embodiment of the interlock mechanism of the disclosed invention is shown in FIG. 32 in which a diagrammatic illustration of an interlock mechanism 290 is shown. The interlock mechanism 290 includes a spring loaded-interlock rod assembly 292 having a movable and substantially horizontal interlock rod 294 and a spring 296. Latch pins 298 and 300 are provided and are movable in response to movement of the interlock rod 294. Each latch pin 298 and 300 includes an end operatively associated with the interlock rod 294, such as the illustrated bevelled edges 302 and 304 respectively. In the event that one or the other of the latch pins 298 or 300 is retracted, the interlock rod 294 moves in a direction opposite the retracted pin, thus blocking the opposite pin from retraction.

As a further aspect of the disclosed invention a supplemental latch mechanism is disclosed and may be used to prevent roof or floor "lozenging" to thus secure the moveable bulkhead in the event of accident in which the roof and the floor are moved apart during an impact event. The anti-lozenging latch is shown in FIGS. 33 through 35.

Figure 33:
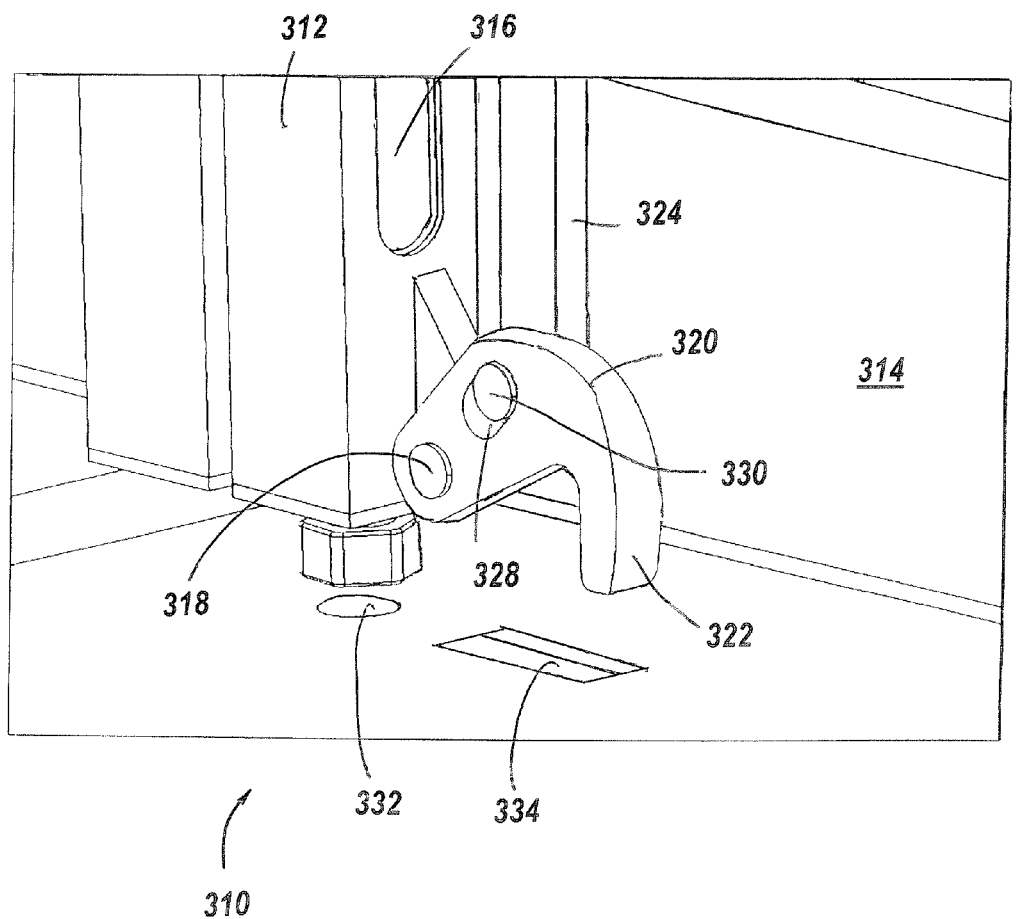
FIG. 33 is a schematic pictorial view of a portion of an anti-lozenging latch mechanism according to the disclosed invention shown in its unlatched position.
Figure 34:
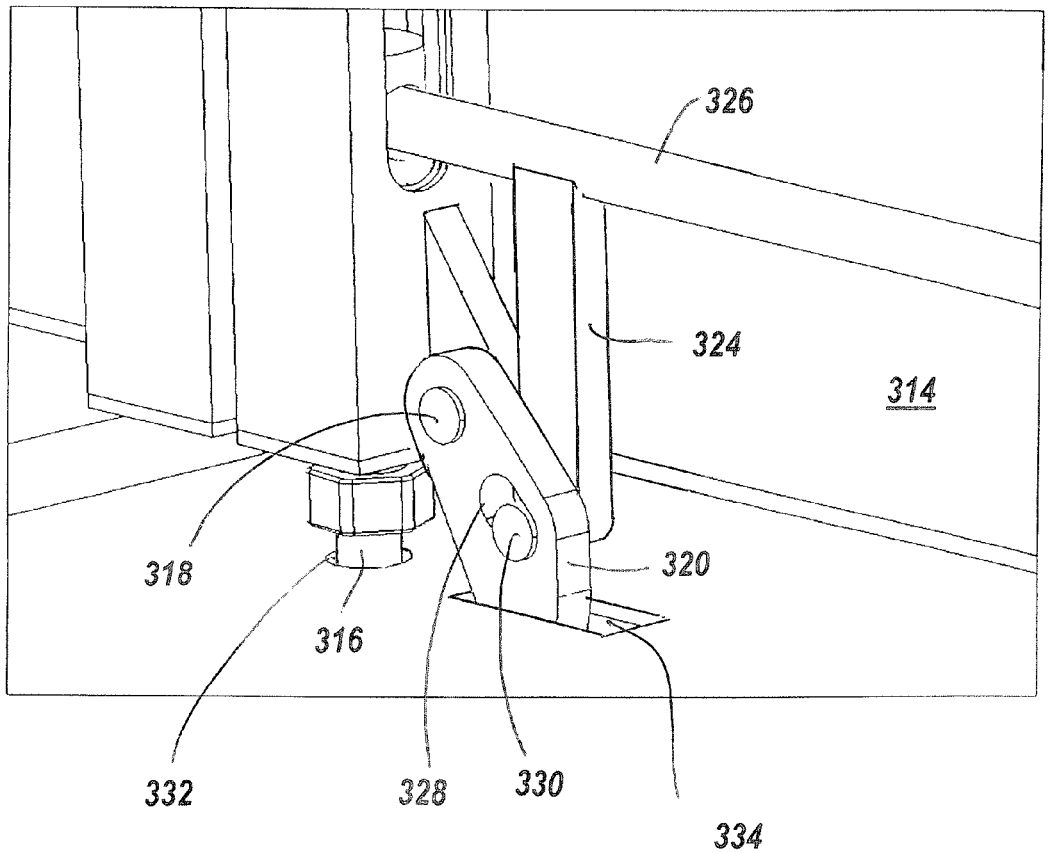
FIG. 34 is a schematic pictorial view of a portion of an anti-lozenging latch mechanism according to the disclosed invention shown in its latched position.
Figure 35:
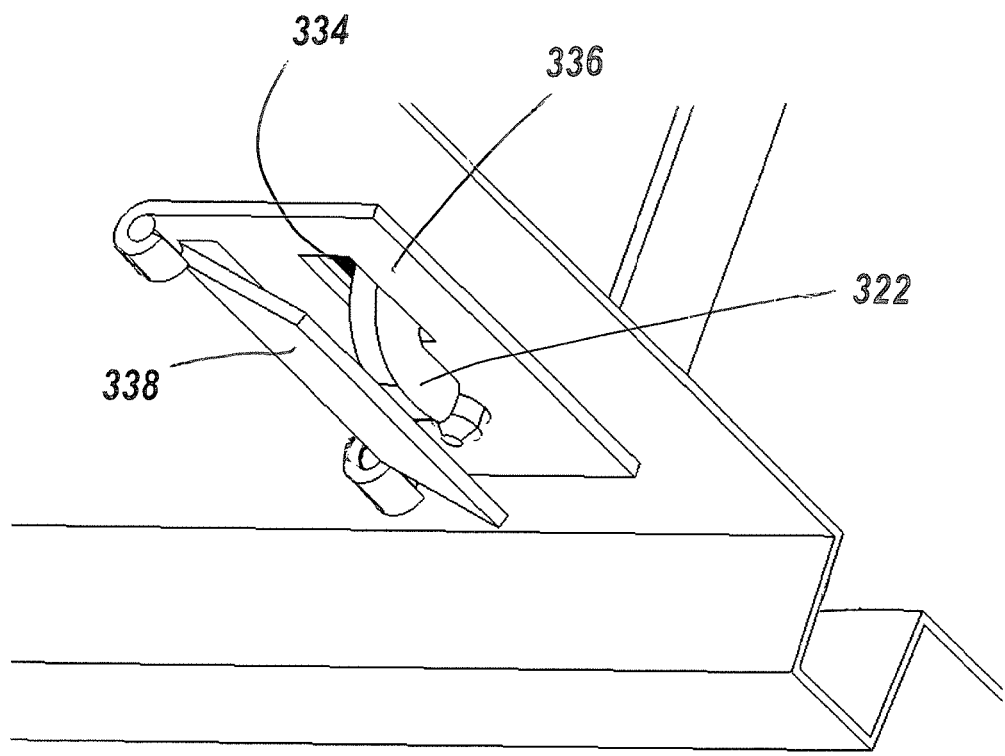
FIG. 35 is a schematic pictorial view of another portion of the anti-lozenging latch mechanism of FIGS. 33 and 34.

Referring to FIGS. 33 and 34, a perspective view of the anti-lozenging latch assembly is shown generally as 310. The assembly 310 includes a latch housing 312 attached to a moveable bulkhead 314. A latch pin 316 (also shown as, for example, any of latches 115R, 123R, 15F, and 123F shown in FIGS. 30a, 30c, and 30e and described in conjunction therewith) and is movably provided within the latch pin housing 312. Pivotably mounted on the side of the latch pin housing 312 by a pivot pin 318 is a latching pawl 320 having a pawl hook 322. The latching pawl 320 is pivotably movable between an unlatched position shown in FIG. 33 and a latched position shown in FIG. 34.

Movement of the latching pawl 320 between the unlatched and latched positions is regulated by a latching pawl control arm 324 which is connected to a transfer rod 326 (also shown as, for example, the transfer rod 133 used to connect the first and second upper latches 115R and 123R to the master lever 130 as shown in FIG. 30a and described in conjunction therewith). The transfer rod 326 is connected to the latch pin 316. A pin slot 328 is formed in the latching pawl 320 through which a pin 330 is movably positioned. The pin 330 is attached to the latching pawl control arm 324.

A latch hole 332 and an adjacent pawl hook slot 334 are formed in either the roof, the floor, or both the roof and the floor of the vehicle 10 as the case may be. The pawl hook slot 334 is reinforced by a reinforcing plate 336 illustrated in FIG. 35 which illustrates an inner view of the latching mechanism of FIGS. 33 and 34. Pivotably attached to the reinforcing plate 336 is a spring loaded hinged cover 338.

In operation, when the transfer rod 326 is moved to its unlatched position as by operation of the actuating handle "H" described above with respect to FIGS. 30a-30f, the latch pin 316 is withdrawn into the latch housing 312 and the latching pawl 320 is moved to its unlatched position as illustrated in FIG. 33. When the actuating handle "H" is moved to its latching position, the latch pin 316 extends from the latch housing 312 and engages the latch hole 332. Simultaneously the latching pawl 320 pivots on the pivot pin 318 such that the pawl hook 322 of the latching pawl 320 engages the pawl hook slot 334.

Additional variations of latch mechanisms to avoid roof or floor lozenging are possible. For example, the latch pin may have a keyway and thus be secured from below with a sliding collar. A further alternative includes a curved pin (as the anti-lozenging latch) which is rotated into place. An additional alternative includes an anti-lozenging latch having a shoulder to rest upon the top surface of the roof or floor cassettes, thereby providing both a push and pull function as well as a horizontal locator function.

Therefore in summary, according to this invention there is provided in one embodiment a bulkhead which can be moved without the use of sliding elements. Instead the moveable bulkhead consists of 3 vertical bulkhead portions which are joined by hinges, allowing the portions to be temporary de-latched to swivel about their hinge axes like doors. The panels and hinge axes are designed such that the unlatched panels can swing into the exact latching position for the translated bulkhead position. Once latched there, the other portions can be unlatched and similarly swung into the designated position and re-latched.

One of the keys to swinging the panels freely when unlatched is that during the latching operation the vertically moving latch acts on the floor of the vehicle and lift the bulkhead approx 5 to 10 millimeters off the floor. Whichever side is de-latched will sag depending on latching tolerances but will remain raised of the floor by the latches of the adjacent panel which remain latched. Only if both panels are de-latched simultaneously will the bulkhead drop fully to the floor ready to be removed.

One advantage of this system is the simplicity and low cost of the mechanism, another advantage is the relative ease of transformation and the package advantage over a sliding mechanism as a result of the panels being reversed during bulkhead translation.

Another advantage of this invention is that the bulkhead can be easily installed as an after market feature as it does not rely on sliding rails incorporated to the body structure. Instead only add-on bulkhead attachment elements, such as the above-described roof cassette 232 and floor cassette 6 or other add-on bulkhead attachment elements, need to be bolted to the body inner structure to provide locations for the latches. The bulkhead panels can then simply be attached to and removed from the cassettes. The bulkhead is therefore always removable and/or stowable without the need for tools etc.

It will be appreciated by those skilled in the art that instead of employing vertically moving latch pins to secure the bulkhead in its two positions there exists an alternative simplified embodiment where the lifting of the end panels off the floor to allow their rotation, as described for the first embodiment, can be used to lock the end panel into position without the requirement of any additional moving parts by means of aligning hook features on the end panel with catch features on the vehicle structure such that the lowering of the end panel after rotation would retain the hook features securely in the catch features.

Further, it will be appreciated that this solution would require hinges which permit a certain amount of vertical movement and a lever mechanism on one hinge for each end panel which enables the end panel to be lifted with respect to the middle panel. The middle panel itself will be a few millimeters shorter then the end panels to ensure that the middle panel will always be suspended above the floor (to allow free rotation) by means of either or both of the two lever mechanisms which lift the end panels being set to the position where the end panel is dropped. This is to say the mechanism which lifts or drops an end panel with respect to the middle panel oppositely drops or lifts the middle panel with respect to the end panels. Therefore, if both end panels are dropped with respect to the middle panel by means of their respective lever mechanisms (and therefore rest on the floor as is the design intent for the fixed positions) then actuating one lever mechanism for one end panel will raise the end panel off the ground, despite the hingedly connected middle panel being suspended off the floor, because if instead it were to lift the middle panel further, it would have to raise both the middle panel and the opposite end panel, as they are locked into position relative to each other by means of the other lever mechanism, the lifting of both is not possible as the combined weight of the middle panel and an end panel is always greater than just one end panel, thereby ensuring by simple law of gravity that the lever mechanism between the middle panel and an end panel will always lift the end panel only.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A motor vehicle having a body structure comprising:
a passenger area of variable size, said passenger area having a first row of seats including a driver's seat and a second row of seats each of which is movable between a stowed position and a deployed position;
a cargo area of variable size; and
a moveable bulkhead dividing said passenger area and said cargo area, said bulkhead comprising a number of panels hingedly connected together and attachable so as to permit each panel to rotate about a vertical axis relative to an adjacent panel, and latches to selectively secure the panels forming the bulkhead in the motor vehicle so as to prevent rotation of the panels and to separate said passenger area from said cargo area.

2. The motor vehicle of claim 1 wherein the bulkhead is latchable in at least a forward position and a rear position and is transformable between the two positions by the sequential un-latching, rotation and re-latching of the panels, said bulkhead being reversibly transformable between a forward position located adjacent to but to the rear of second row of seats when stowed and a rear position located adjacent to but to the rear of the second row of seats when deployed.

3. The motor vehicle of claim 2 wherein the bulkhead is U-shaped when it is latched in the forward position and end panels of the bulkhead extend longitudinally forwardly past the stowed second row of seats to positions where they are latched to the motor vehicle close to the b-pillars.

4. The motor vehicle of claim 1 in which, the second row of seats comprises at least two separate stowable seats, the bulkhead is comprised of a first L-shaped end panel which has a wing portion that extends forwardly when the bulkhead is latched in the forward position and is latchable near to the b-pillar on that side of the motor vehicle, a second L-shaped end panel which has a wing portion that extends forwardly when the bulkhead is latched in the forward position and is latchable near to the b-pillar on that side of the motor vehicle and a middle panel which is hingedly connected at one end to the first end panel and is hingedly connected at an opposite end to the second end panel wherein the bulkhead is transformable to a side locker configuration in which the wing portion of one of the end panels extends longitudinally forwardly and is latchable near to the b-pillar on one side of the motor vehicle.

5. The motor vehicle of claim of claim 1 wherein the bulkhead includes at least first and second end panels each of which extends forwardly when the bulkhead is latched in a forward position in the vehicle and extends rearwardly when the bulkhead is latched in a rear position in the vehicle.

6. The motor vehicle of claim 5 wherein each of the first and second end panels is "L"-shaped having wing portions that are arranged longitudinally with respect to the vehicle when the bulkhead is latched in the vehicle in either of the forward and rear positions and body portions that are arranged transversely with respect to the vehicle when the bulkhead is latched in the vehicle in either of the forward and rear positions.

7. The motor vehicle of claim 5 wherein the moveable bulkhead system comprises the first end panel which extends forwardly when the bulkhead is latched in the forward position in the vehicle and extends rearwardly when the bulkhead is latched in the rear position, the second end panel which extends forwardly when the bulkhead is latched in a forward position in the vehicle and extends rearwardly when the bulkhead is latched in the rear position and a middle panel which is hingedly connected at one end to the first end panel and is hingedly connected at an opposite end to the second end panel.

* * * * *